US005461496A

United States Patent [19]

Kanada et al.

[11] Patent Number: 5,461,496

[45] Date of Patent: Oct. 24, 1995

[54] LIGHT TRANSMITTING PANELS, AND METHODS FOR ADJUSTING THE NATURAL LIGHTING QUANTITY AND RANGE USING ANY OF THE LIGHT TRANSMITTING PANELS

[75] Inventors: Yoshimi Kanada; Yoshikazu Danmura, both of Tokyo, Japan

[73] Assignee: Figla Co., Ltd., Tokyo, Japan

[21] Appl. No.: 196,243

[22] PCT Filed: Jun. 16, 1993

[86] PCT No.: PCT/JP93/00805

§ 371 Date: Feb. 17, 1994

§ 102(e) Date: Feb. 17, 1994

[87] PCT Pub. No.: WO93/25792

PCT Pub. Date: Dec. 23, 1993

[30] Foreign Application Priority Data

| | | | |
|---|---|---|---|
| Jun. 17, 1992 | [JP] | Japan | 4-181526 |
| Jun. 24, 1992 | [JP] | Japan | 4-188893 |
| Jun. 30, 1992 | [JP] | Japan | 4-194565 |
| Aug. 24, 1992 | [JP] | Japan | 4-064437 U |
| Apr. 13, 1993 | [JP] | Japan | 5-024126 U |
| Apr. 13, 1993 | [JP] | Japan | 5-024127 U |
| Apr. 20, 1993 | [JP] | Japan | 5-115246 |

[51] Int. Cl.$^{6}$ .............................. G02B 17/00; G02B 27/00

[52] U.S. Cl. .............................. 359/592; 359/595; 359/597

[58] Field of Search .............................. 359/591, 592, 359/594, 595, 597, 598

[56] References Cited

U.S. PATENT DOCUMENTS

| | | | |
|---|---|---|---|
| 618,280 | 1/1899 | Manning . | |
| 3,085,474 | 4/1963 | Bourgeaux et al. | 88/60 |
| 3,255,665 | 6/1966 | Weiher et al. | 88/60 |

FOREIGN PATENT DOCUMENTS

| | | |
|---|---|---|
| 51-74426 | 6/1976 | Japan . |
| 54-155637 | 12/1979 | Japan . |
| 56-150702 | 11/1981 | Japan . |
| 59-33004 | 2/1984 | Japan . |
| 60-188558 | 9/1985 | Japan . |
| 62-141291 | 6/1987 | Japan . |

*Primary Examiner*—Richard A. Wintercorn
*Attorney, Agent, or Firm*—Koda and Androlia

[57] ABSTRACT

The present invention relates to light transmitting panels mainly applied to lighting windows in openings of general buildings and lighting quantity or range adjusting methods for interiors of general buildings using any of the light transmitting panels. One of the light transmitting panels consists of two transmitting plates and plural refractive columns located in parallel to each other between the two plates, and another of the light transmitting panels consists of base faces with reflecting zones parallel to each other formed on them. Furthermore, optional sunlight patterns S1, S2 and S3 incident from the sun located differently in altitude or azimuth with respective incident angles of $\alpha$, $\beta$ and $\gamma$ in reference to altitude or azimuth satisfying the relation of $\alpha<\beta<\gamma$ are selected as the sunlight patterns used for adjusting the lighting quantity or range by devising the structure of the light transmitting panel used, in order that the difference in the quantity of heat in the interior caused by respective seasons and respective time zones due to the annual or daily motion of the sun may be adjusted by using the difference of the sun in altitude or azimuth, for effective utilization of heat.

6 Claims, 23 Drawing Sheets

LIGHT TRANSMITTING PANELS, AND METHODS FOR ADJUSTING THE NATURAL LIGHTING QUANTITY AND RANGE USING ANY OF THE LIGHT TRANSMITTING PANELS

TECHNICAL FIELD

The present invention relates to light transmitting panels used as lighting windows in the openings of ceilings, floors, walls, etc. of general buildings. In more detail, the present invention relates to light transmitting panels to be stationarily installed in the openings for optically changing the sunlight incident on the openings by way of refraction, reflection, etc. for obtaining desired natural lighting by selectively adjusting the quantity and range of the sunlight changing in relation with the annual and daily motion of the sun, thereby controlling the quantity of heat in the indoor space. The present invention also relates to methods for adjusting the quantity and range of natural lighting using any of the light transmitting panels.

DISCLOSURE OF THE INVENTION

Most of the openings in the ceilings, walls, etc. of general buildings are provided respectively as a lighting window using a single glass sheet, a double layer glass panel with an air layer between two glass sheets or a glass panel with a resin layer laminated, etc., for interior lighting using solar light or artificial illumination, etc. Special lighting windows intended for intercepting direct sunlight are disclosed in West German Patent Laid-Open Nos. 1683284, 1906990, 3138262, 3227118, etc.

These lighting windows are shading devices using an improved Fresnel prism system which is a plate with many right-angled prisms or prisms with a metallic film on some optical faces integrally formed as plural blocks. Especially West German Patent Laid-Open Nos. 3138262 and 3227118 disclose an improved technique for introducing scattered light, to perfectly intercept direct sunlight and to secure indoor illumination.

However, such a lighting window using a Fresnel prism system does not contribute to securing a comfortable temperature range in an indoor dwelling space. The reason is that since the quantity of heat obtained from sunlight depends on the annual and daily motion of the sun, i.e., changes due to seasons and daily time zones, intercepting all the sunlight means that a sufficient warming effect cannot be obtained in winter when a larger quantity of heat is required.

SUMMARY OF THE INVENTION

A first object of the present invention is to provide a new light transmitting panel which can automatically adjust the quantity of sunlight passing through an opening of a general building for indoor space lighting, and also a method for adjusting the lighting quantity using the light transmitting panel.

That is, the present invention partially introduces direct sunlight for lessening the temperature difference in an indoor space caused by the changes of seasons and daily time zones, instead of preventing the transmission of direct sunlight affecting visibility. To describe this feature in reference to the annual motion of the sun, if the light transmitting panel of the present invention is adopted in a lighting window, the sunlight supplying a larger quantity of heat in summer is positively intercepted or concentrically turned toward the ceiling, etc. of a room for inhibiting the temperature rise in the main region of the room used as a dwelling space, and the sunlight in spring and autumn is partially intercepted to maintain the temperature in an adequate range, while the sunlight supplying a smaller quantity of heat in winter is positively introduced into the indoor space, for lessening the difference in the quantity of heat obtained by sunlight between the respective seasons, to contribute to the decrease of air conditioning load.

A second object of the present invention is to achieve said first object by a lighting window stationarily installed in an opening of a general building without making any adjustment. In West German Patent Laid-Open No. 3138262, etc., the plate with many prisms formed can be adjusted in angle by rotary shafts provided at both the ends in longitudinal direction. Therefore, in the lighting window with the plate installed, the effect as intended in the first object can be achieved by artificially properly adjusting the angle. However, with the conventional plate designed mainly to intercept direct sunlight, the angle must be inconveniently adjusted to achieve the intended effect by observing whether the sunlight is actually intercepted or introduced. Therefore, if any competent operator skilled in such observation and adjustment is not available in the building, the intended effect to decrease the air conditioning load cannot be achieved, and on the contrary, the load may be even increased by the existence of the plate installed and left unadjusted. Furthermore, the pivotal rotation of many plates requires a very complicated drive system, and also considering the automation of pivotal rotation, a higher manufacturing cost and complicated processing cannot be avoided. The light transmitting panel with refractive columns disclosed in the former half of the present invention to solve these problems does not use the conventional plate with plural prisms integrated, but adopts plural refractive columns respectively separately manufactured by extrusion molding, etc., to have respectively independent optical characteristics, and also holders capable of holding the refractive columns at proper intervals and angle without impairing their optical roles, in a very simple structure without requiring any adjustment after installation.

The inventors at first selected a summer sunlight pattern, a vernal and autumnal sunlight pattern and a winter sunlight pattern, as sunlight patterns required for adjusting the lighting quantity throughout the year. Then, they considered the change in orbital curve caused by the annual motion of the sun, and paid attention to the fact that the difference in altitude of the sun between the respective seasons appears as the difference in incident angle to an opening such as a window or skylight facing almost the south. On the other hand, since the peak quantity of indoor heat obtained by natural lighting occurs almost when the sun moves at the highest position in each season, the first object can be achieved by using proper optical members in the opening to perfectly intercept the sunlight with an incident angle of $\gamma$ at the culmination altitude near the summer solstice, to allow the sunlight with an incident angle of $\alpha$ near the winter solstice to transmit, and to handle the sunlight with an incident angle of $\beta$ near the vernal equinox and the autumnal equinox intermediately.

That is, the inventors found a method for selectively adjusting the lighting quantity and range by identifying the sunlight patterns different in the amount of insolation in reference to their incident angles. The relation among the incident angles $\alpha$, $\beta$ and $\gamma$ of sunlight is $\alpha<\beta<\gamma$. Therefore, the method for adjusting the lighting quantity found by paying attention to the annual motion of the sun can also be applied for adjusting the lighting quantity in relation with the daily motion of the sun, by identifying a sunlight pattern with an incident angle of $\delta$ in the morning and evening and a sunlight pattern with an incident angle of $\epsilon$ at the culmination in the relation of $\delta<\epsilon$. As for the optimum optical form of the refractive columns to satisfy the above conditions, at first, the use of right-angled prisms allowing total reflection can be considered. However, if a conventional Fresnel prism system with plural rows of prisms integrated is used for example, in an opening of a vertical wall, the respective prisms are located with their faces opposite to their vertex angles inclined to the plane perpendicular to the sunlight at the culmination altitude near the summer solstice, and a significantly large space is required for securing the pivotal rotation range of the plate. So, the first embodiment of the present invention adopts mutually independent right-angled prisms as the most advantageous optical members, and the light transmitting panel is formed by using two plates for protecting the right-angled prisms and holders capable of holding the right-angled prisms at proper intervals and angle between the plates.

A third object of the present invention is to allow the adoption of refractive columns not limited in form. The light transmitting panel of the present invention does not require to trace the orbital change of sunlight for perfect interception, as described before. Especially the refractive columns used for adjusting the lighting range are only required to cause the sunlight patterns different in incident angle to be refracted respectively in different directions, and therefore the optical forms of the refractive columns can be various. The light transmitting panel adjustable in lighting range turns the summer sunlight pattern toward the ceiling, etc., for illuminating the ceiling or for collecting heat on the ceiling face for use as a heat source for a solar system. Thus, the same effect as obtained with the light transmitting panel adjustable in light quantity can be substantially achieved.

As refractive columns to satisfy these conditions, the inventors present not only right-angled prisms but also various refractive columns different in sectional form. Among these refractive columns, those stable in lamination and those with flat opposite faces can be held and fixed between two plates in contact with them. So they do not require any holders or allow a simpler structure to be adopted, for allowing the light transmitting panel to be manufactured more simply. Especially refractive columns formed like pipes can be used as heat collecting pipes since a liquid, etc. can be circulated in the hollow portions, or can also be used for achieving any new decorative effect.

A fourth object of the present invention is to improve capabilities in achieving the above objects. The light transmitting panel using refractive columns of the present invention have the refractive columns located in the enclosed space between the two transmitting plates, for protecting them from damage, etc. This structure can be used to fill the enclosed space with an inactive gas or to reduce the pressure in the enclosed space for enhancing durability. Furthermore, since the two plates used can transmit light, the sunlight which has passed or is going to pass through the refractive columns can be easily controlled using a heat reflecting film or a diffusing surface, etc.

A fifth object of the present invention is to allow people to see the exterior and the interior through the light transmitting panel as an essential function of a lighting window. The conventional non-movable shading device using prisms is not transparent, and so can be installed only for a skylight, etc. which does not require any transparency. The present invention uses plural refractive columns separately produced by extrusion molding, etc. to have respectively independent optical characteristics, and hence transparency can be easily secured by specially designing the arrangement and sectional forms of the refractive columns.

A sixth object of the present invention is to provide a basic building material applicable to other parts than the lighting window, in addition to achieving the first object. This is concerned with the light transmitting panel disclosed mainly in the latter half of the present invention. In this light transmitting panel, on at least two base faces facing each other with a certain interval kept between them transmitting zones and reflecting zones are formed alternately, to allow the lighting quantity to be adjusted like the light transmitting panel using refractive columns and to allow application not only for an opening, but also as a partition wall requiring ventilation or an outdoor building material by combining a transmitting base and a reflecting material or combining a light intercepting (reflecting) base and through holes.

DETAILED DESCRIPTION OF THE INVENTION

The light transmitting panels of the present invention stated in the respective claims are formed as multi-layer panels excellent in heat insulation, sound insulation, etc. with an air layer between two glass sheets of float plate glass or figured glass or two transmitting resin sheets, etc., as shown in FIGS. 1 through 46.

The light transmitting panels of the present invention can be effectively applied not only as lighting windows in the openings of the ceilings, floors, walls, etc. of general buildings but also as front panels such as illumination-installed decorative walls of general buildings. To install a light transmitting panel in an opening of a general building, a frame, etc. made of a metal, etc. is installed in the opening, for installing the light transmitting panel in it.

FIGS. 1 to 7 are schematic illustrations for illustrating the light transmitting panel I stated in claim 1.

Figure 1:
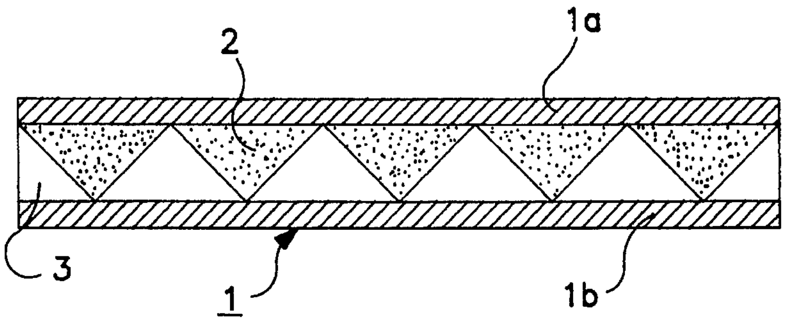
FIG. 1 is a schematic sectional view showing the light transmitting panel of a first embodiment.
Figure 2:
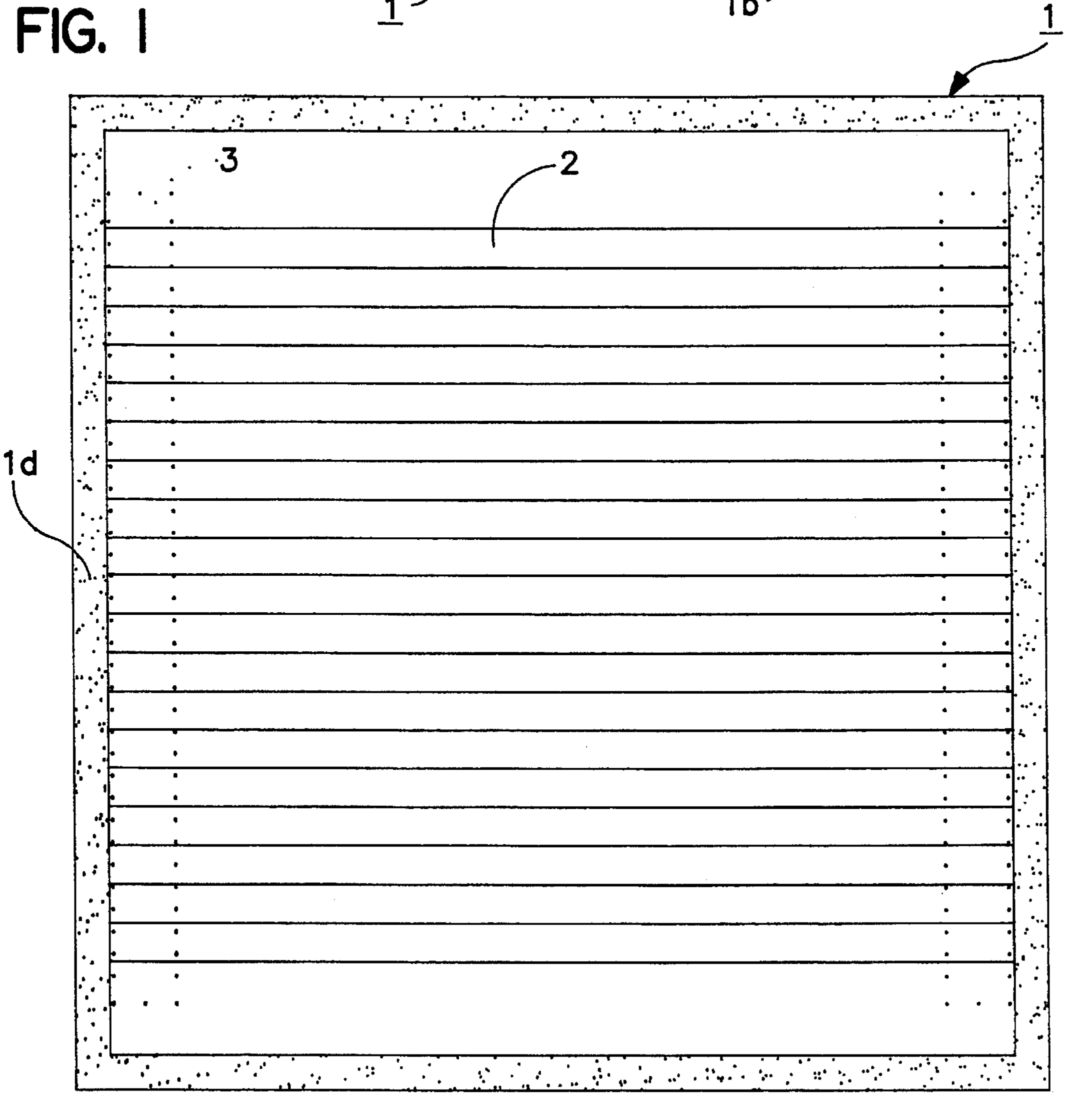
FIGS. 2, 3 and 4 are schematic front views showing the light transmitting panel of FIG. 1.

The light transmitting panel 1 stated in claim 1 consists of two transmitting plates 1*a* and 1*b* and plural refractive columns located in parallel to each other between the plates 1*a* and 1*b*, as shown in FIGS. 1 to 7, and the respective refractive columns 2 are fastened between the plates 1*a* and 1*b* by holders 3 supporting the respective refractive columns 2, with the short portions at the ends of the bodies of the refractive columns 2 on both sides as supported faces, as shown in the schematic front view of FIG. 2.

The refractive columns 2 are columns produced by extrusion molding of a synthetic resin such as acrylic resin or polycarbonate or molded glass columns, and those illustrated in FIGS. 1 to 7 are right-angled triangles in sectional form.

The holders 3 are made of an elastic synthetic resin such as rubber or the same hard synthetic resin as used for the refractive columns 2, or metallic parts such as leaf springs, or seals with flexibility when hardened between the two plates 1*a* and 1*b* and the respective refractive columns 2, or made by combining these materials.

In the example shown in FIG. 1, the flat optical faces of the refractive columns 2 contact one of the plates, 1*a*, and the holders 3 are formed to have column fitting portions to fit the apex angles of the refractive columns 2 and inserted between the refractive columns 2 at the ends of their bodies on both sides and the plate 1*b*, for fastening the refractive columns 2 between the two plates 1*a* and 1*b*.

Figure 7:
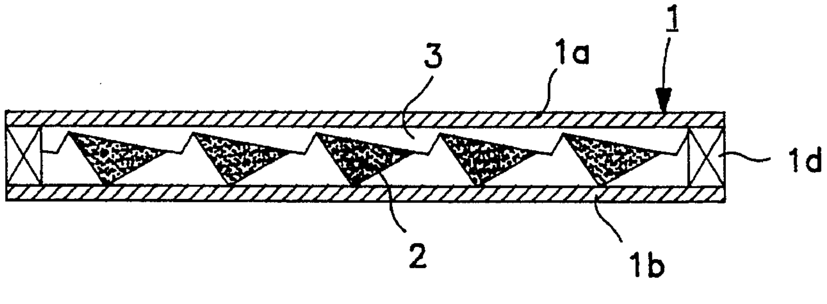
FIG. 7 is a schematic sectional view illustrating the light transmitting panel of the present invention.

On the other hand, in the example shown in FIG. 7, to fasten the refractive columns 2 at a certain angle against the plates 1*a* and 1*b*, the upper halves of the holders 3 are formed to have column fitting portions to fit the flat bottom faces of the refractive columns 2, and the lower halves of the holders 3 are formed to have column fitting portions to fit the apex angles. The upper halves of the holders 3 are inserted between the refractive columns 2 at the ends of their bodies on both sides and the plate 1*a*, and the lower halves are inserted between the refractive columns 2 at the ends of their bodies on both sides and the plate 1*b*, for fastening the refractive columns 2 between the two plates 1*a* and 1*b*. The distance between the plates 1*a* and 1*b* can be substantially kept by the holders 3, or by a seal 1*d* as a spacer separate from the holders 3.

The holders in FIGS. 1 to 7 are located at the ends of the respective refractive columns 2 on both sides, as shown in the schematic front view of FIG. 2. Therefore, if the light transmitting panel 1 of the present invention is installed in an opening of a building, the sunlight, etc. incident on one of the plates, 1*a*, is optically changed by way of refraction, reflection, etc., depending on the incident angle, almost in the entire range of the bodies of the refractive columns 2, and the optically changed light is transmitted through the other plate 1*b* into the interior. The holders 3 located at the ends on both sides can be hidden under a metallic frame to allow excellent designing.

If the light transmitting panel 1 of the present invention is kept used, the quantity of heat is accumulated in the refractive columns 2, depending on the change in the quantity of heat contained in the sunlight, and the refractive columns 2 may be thermally expanded or deflected. This inconvenience can be met by the fixing mechanisms for the refractive columns 2 shown in FIGS. 3 and 4.

Figure 3:
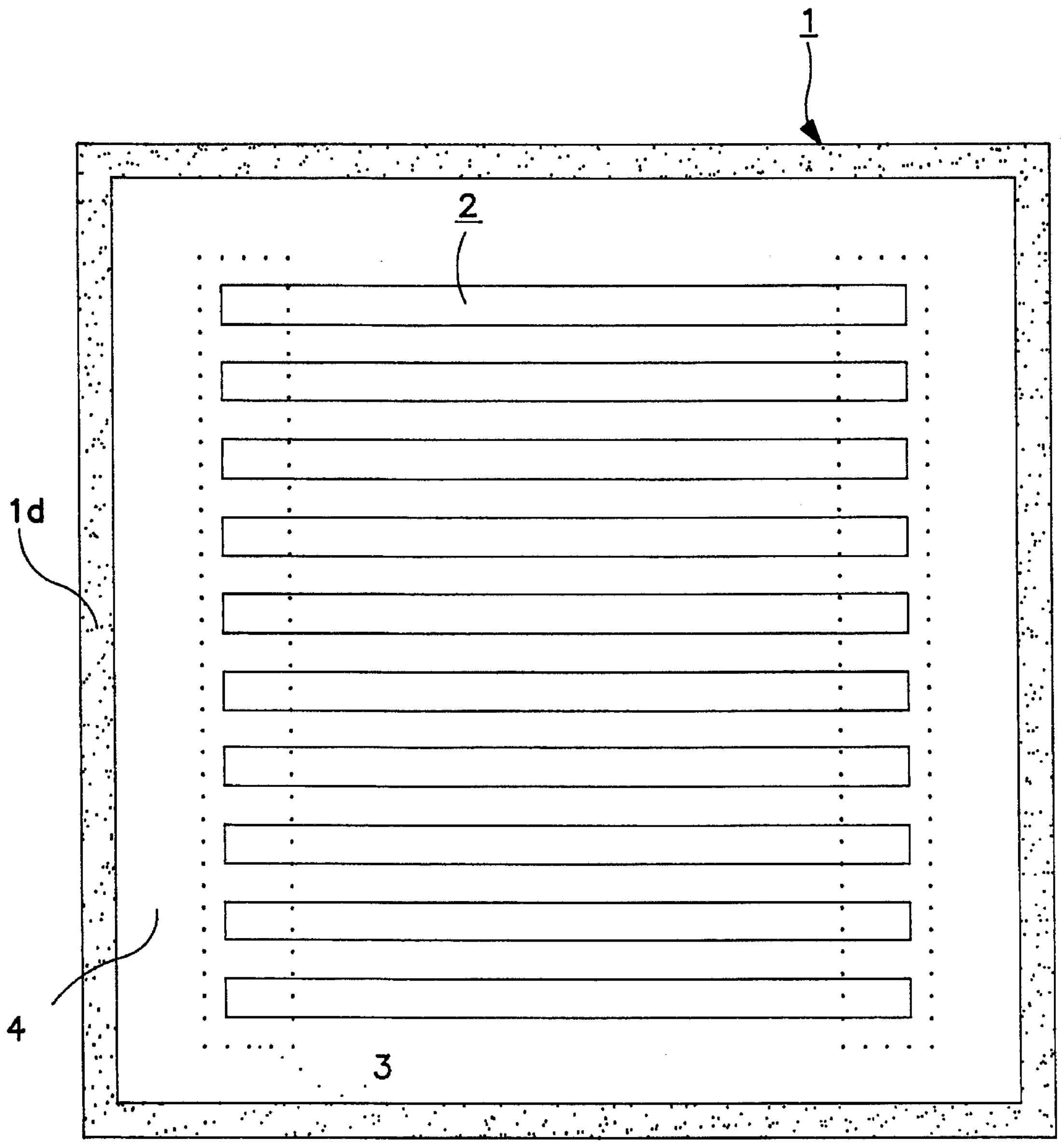

A fixing mechanism to meet the thermal expansion or contraction of the refractive columns 2 in the axial direction is shown in the schematic front view of FIG. 3. The holders 3 are located at the ends of the refractive columns 2 on both sides, as in FIG. 2, and in this case, a clearance 4 is formed between the ends of the refractive columns 2 at least on one side and the seal 1*d* provided at the periphery of the plates 1*a* and 1*b*. The existence of the clearance 4 prevents that when the refractive columns 2 are thermally expanded in the axial direction, the ends of the refractive columns 2 contact the seal 1*d*, for deforming the seal 1*d* and the refractive columns 2 by the stress.

For more effective functioning of the clearance 4, it is recommended, for example, that the holders 3 slightly more narrow than the distance between the plates 1*a* and 1*b* achieved by the seal 1*d* are strongly and integrally set with the ends of the refractive columns 2, so that when the refractive columns 2 are expanded in the axial direction, the holders 3 may be moved in the clearance 4 in the axial direction.

Figure 4:
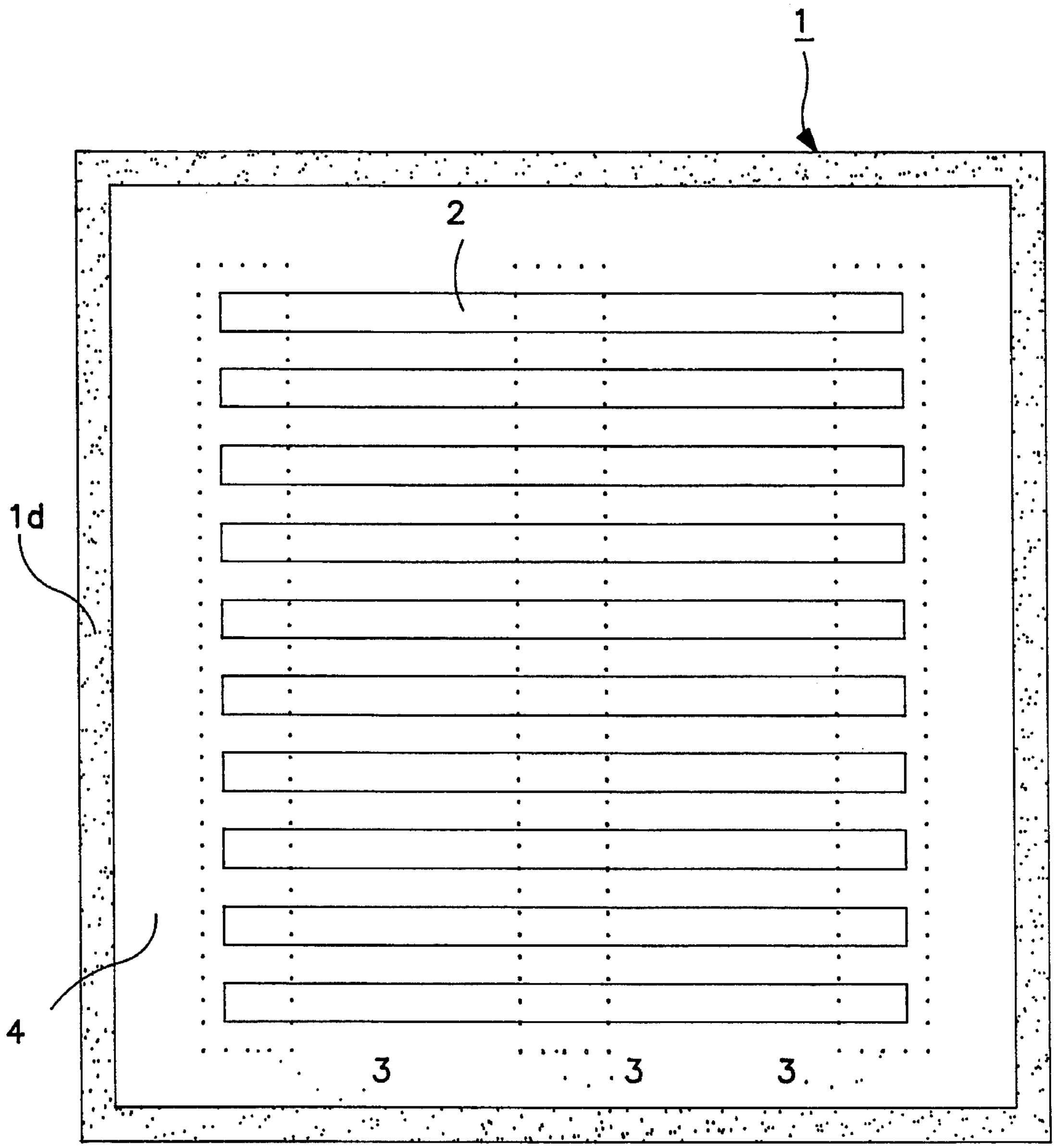

Another fixing mechanism for preventing the refractive columns 2 from being deflected in their bodies by their own weight or heat is illustrated in the schematic front view of FIG. 4. In this example, a third holder 3 is installed also at the centers of the refractive columns 2, for preventing the deflection at the centers of the bodies where stresses are concentrated. In this case, since the third holder 3 is installed almost as a straight line in the direction perpendicular to the refractive columns 2, the light transmitting panel appears like a latticework in combination with the holders at the ends on both sides, or the frame hiding the holders 3 at the ends on both sides.

Figure 5:
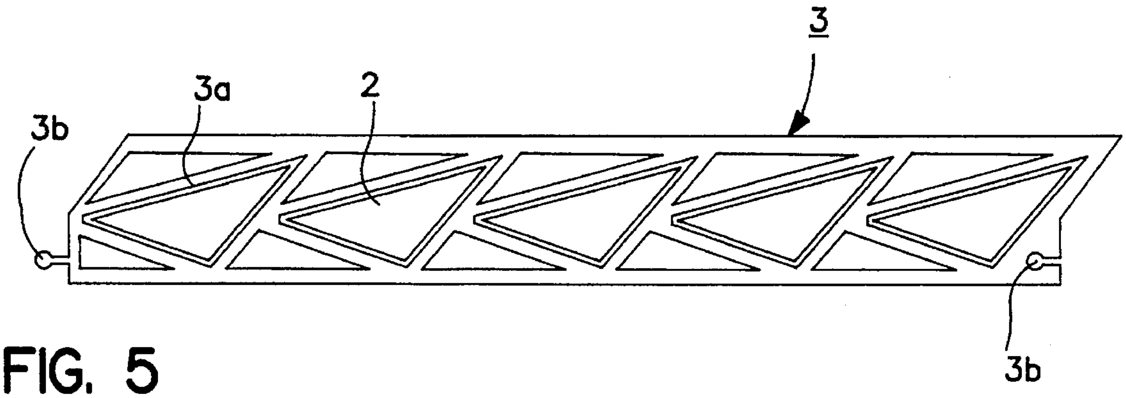
FIGS. 5 and 6 are schematic illustrations showing the holders used in the light transmitting panel of the first embodiment.

FIG. 5 is a schematic illustration showing the structure of the holder 3 as an example. A member of the holder 3 of this example is almost a rectangle with a width almost equal to the distance between the plates 1*a* and 1*b* and with a proper length to accommodate a proper number of the refractive columns 2, as illustrated, and has column fitting portions 3*a* almost the same in sectional form as the ends or bodies of the respective columns 2. If the successive refractive columns 2 are the same in form as illustrated, the successive column fitting portions 3*a* are the same in form, but if the refractive columns 2 are respectively different in form, the column fitting portions must be formed to correspond to the respectively differently formed refractive columns 2, needless to say. The column fitting portions 3*a* are grooves or through holes, etc. The column fitting portions 3*a* formed as grooves are used to hold the refractive columns 2 at the ends on both sides, and the column fitting portions 3*a* formed as through holes are used to hold the refractive columns 2 at the centers. The number of the holders 3 is properly decided, considering the size, etc. of the plates 1*a* and 1*b* of the light transmitting panel 1, depending on working efficiency, productivity, etc. Each member of the holder 3 has a connecting recess 3*b* and a connecting protrusion 3*b* at both the ends in the longitudinal direction. A proper number of the members of the holder 3 are connected through the connecting recesses and protrusions 3*b*, to form the holder 3, and the refractive columns 2 are inserted at their ends on both sides or at their ends on both sides and at their centers into the column fitting portions 3*a* of the holders 3. Then, the respective refractive columns 2 are located between the two plates 1*a* and 1*b*.

When the refractive columns 2 are located between the two plates 1*a* and 1*b*, it is preferable to keep the clearances 4 between the ends of the refractive columns 2 on both sides and the seal 1*d*. In this case, if the column fitting portions 3*a* of the holders 3 provided at the ends of the refractive columns 2 on both sides are through holes, the clearances 4 to allow the axial expansion of the refractive columns 2 can be formed very easily.

Figure 6:
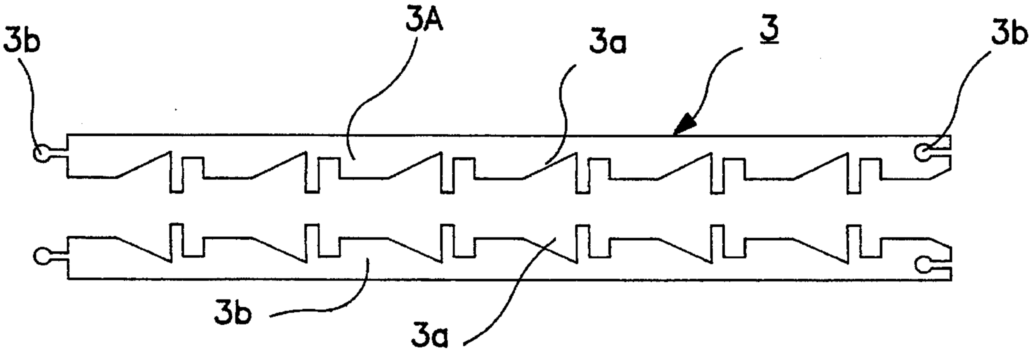

A further other example of the holder 3 is shown in the schematic illustration of FIG. 6. The holder 3 of this example is intended to avoid the troublesome work for inserting the refractive columns 2 different in sectional form and the complicated molding to form the column fitting portions 3*a*, which are inevitable with the holder 3 shown in FIG. 5.

The holder 3 of FIG. 6 can be used for the refractive columns 3 trapezoidal in sectional form, and consists of a first half 3A and a second half 3B formed by splitting the holder 3 at the center in the longitudinal direction. In addition to the effects mentioned above, the holder 3 of this structure can be advantageously used for holding the refractive columns 2 at the centers of their bodies. To assemble any these holders 3, a proper number of the refractive columns 2 can be assembled with a set of members of the holder 3, for forming a unit which can then be connected with other similarly assembled units through the connecting recesses and protrusions 3*b*, for greatly simplifying the assembling work.

Figure 8:
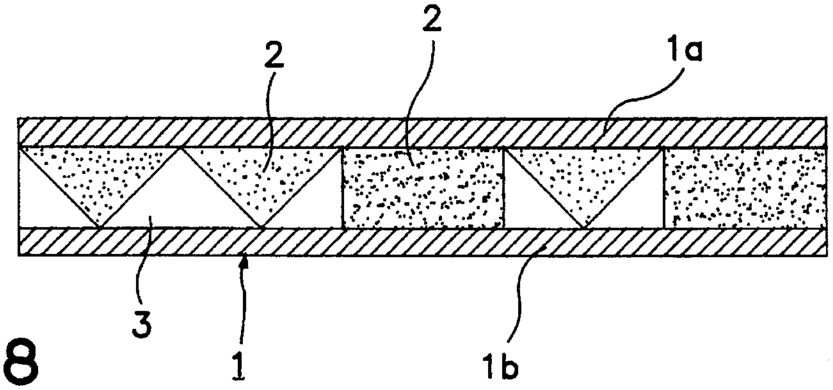
FIG. 8 is a schematic sectional view showing the light transmitting panel of the present invention.

FIG. 8 is a schematic sectional view illustrating the light transmitting panel stated in claim 2.

The light transmitting panel 1 stated in claim 2 consists of two transmitting plates 1A and 1*b* and plural refractive columns 2 located in parallel to each other between the plates 1*a* and 1*b*, as shown in FIG. 8, and at least one of the refractive columns 2 is held and fixed between the plates 1*a* and 1*b*, in solid contact with the plates 1*a* and 1*b*.

Figure 9:
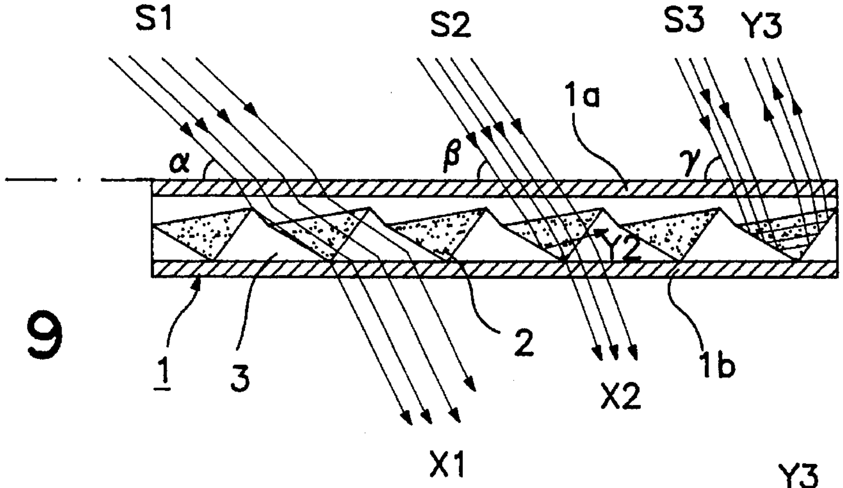
FIGS. 9, 10 and 11 are functional illustrations showing the light quantity adjustment method of the present invention.
Figure 10:
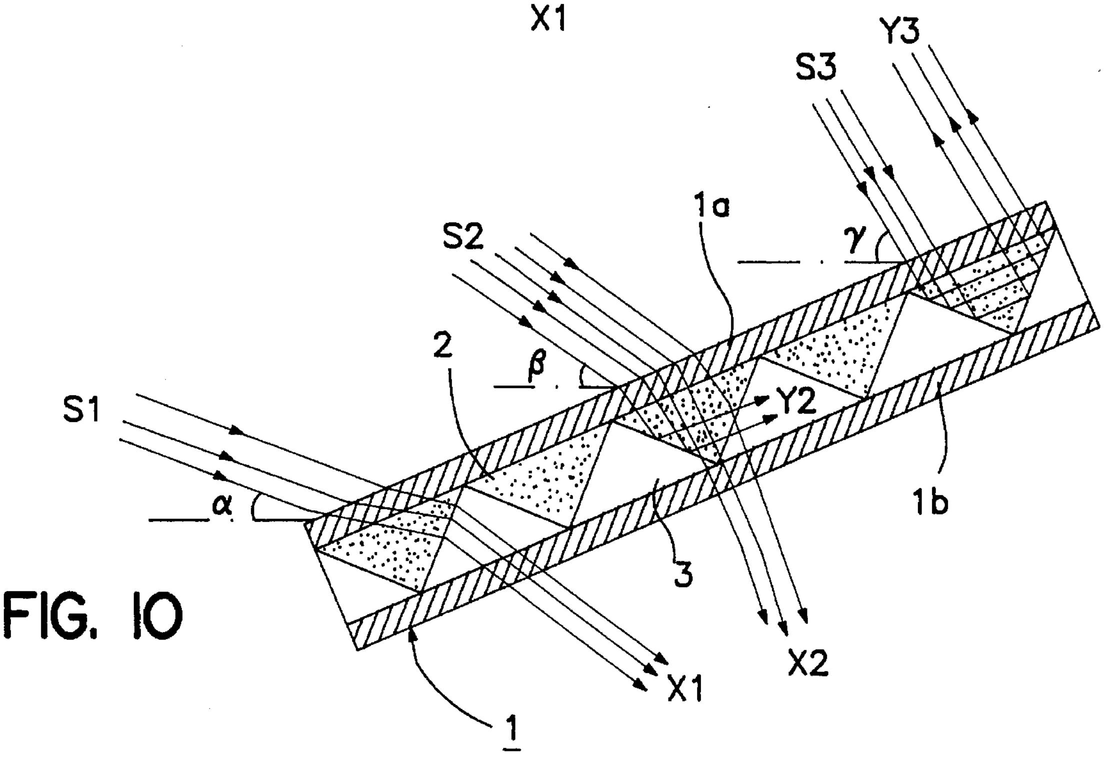
Figure 11:
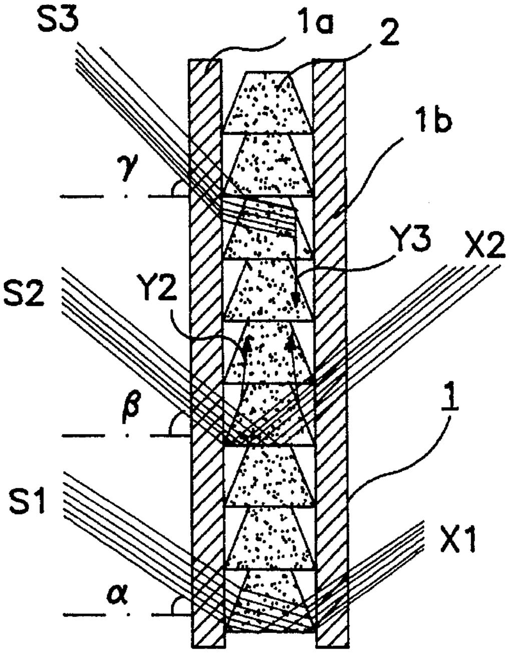

The light transmitting panel 1 does not have the holders 3 stated in claim 1. In the example shown in FIG. 8, two of the refractive columns 2 are rectangular in sectional form. In this example, since the rectangular refractive columns 2 are flat in their opposite optical faces, the holders 3 shown in FIGS. 1 to 7 are not required to be used. In the illustrated example, since the refractive columns 2 rectangular in sectional form and those right-angled triangular are used together, it is recommended to use the holders 3 for the right-angled triangular refractive columns 2 on the apex angle side at the ends on both sides in the axial direction. The light transmitting panel 1 with the refractive columns 2 fastened between the plates 1*a* and 1*b* in contact with them is applied in the functional illustrations of the light transmitting panels 1 shown in FIGS. 11 to 15. FIGS. 9 to 11 are functional illustrations of the light transmitting panels 1 for explaining the lighting quantity adjusting method stated in claim 3.

The lighting quantity adjusting method stated in claim 3 uses a light transmitting panel 1 with plural refractive columns 2 located in parallel to each other. The light transmitting panel 1 is as stated mainly in claim 1 or 2, but can be a laminate consisting of the refractive columns 2 only without using the plates 1*a* and 1*b* (not illustrated).

The lighting quantity adjusting method of the present invention uses a light transmitting panel 1 with plural refractive columns 2 located in parallel to each other, and the sunlight patterns selected for adjusting the lighting quantity are optional sunlight patterns S1, S2 and S3 incident from the sun located differently in altitude or azimuth with respective incident angles of α, β and γ in reference to altitude or azimuth satisfying the relation of $\alpha<\beta<\gamma$.

With attention paid to the change in the position of the sun caused by the annual motion or daily motion of the sun, the incident angle of the sunlight incident on the light transmitting panel 1 installed horizontally in a skylight can be expressed by an altitude or azimuth. In this case, if attention is paid to the change of the sun in altitude by its annual motion, the sunlight pattern small in incident angle can be easily identified as that of winter, the sunlight pattern large in incident angle, as that of summer and the sunlight pattern intermediate in incident angle, as that of spring and autumn. In this case, the sunlight patterns selected for adjusting the lighting quantity are the sunlight patterns S1, S2 and S3 of α, β and γ in incident angle in the respective seasons at the culmination altitude in the northern hemisphere with the azimuth kept constant.

In the example of FIG. 9, in a skylight with the light transmitting panel 1 horizontally installed, among the incident angles α, β and γ of the sunlight patterns S1, S2 and S3 on the light transmitting panel 1 under the above mentioned conditions, the following relation holds approximately, depending on the inclination of the earth's axis, irrespective of the latitude of the site at which the building concerned exists.

$$\alpha+23.4°=\beta=\gamma-23.4°(\alpha<\beta<\gamma)$$

On the other hand, to effectively obtain the required quantities of heat by introduction of sunlight in the respective seasons, it is required to positively introduce the winter sunlight pattern S1 into the interior requiring a considerable quantity of heat, to partially introduce the vernal and autumnal sunlight pattern S2 into the interior requiring a some quantity of heat, and to positively intercept the summer sunlight pattern S3 for preventing light introduction into the interior requiring no quantity of heat.

In the lighting quantity adjusting method of the present invention, the respective refractive columns 2 are located, for example, horizontally in the east-west direction, and the quantity of heat in the interior space obtained by the respective sunlight patterns S1, S2 and S3 different in the amount of isolation is adjusted by using the difference in incident angle, for positively introducing the sunlight pattern S1 incident on the light transmitting panel at an incident angle of α as refracted light X1 using the refractive columns 2, partially introducing the sunlight pattern S2 of β in incident angle as refracted light X2 and intercepting the balance as reflected light Y2 using the refractive columns 2, and positively intercepting the sunlight pattern S3 of γ in incident angle as reflected light Y3 using the refractive columns 2.

The refractive columns 2 illustrated in FIGS. 9 and 10 are right-angled prisms allowing total reflection which can be preferably used for the lighting quantity adjusting method of the present invention. The refractive columns 2 used in the present invention are not limited to the sectional form illustrated here, as can be seen from the refractive columns 2 of FIG. 11, etc.

The example of FIG. 9 shows a structure in which the light transmitting panel 1 is horizontally installed in a skylight. The example of FIG. 10 shows a structure in which the light transmitting panel 1 is installed obliquely in a skylight. In FIG. 9, the bottom faces opposite to the apexes of the refractive columns 2 are kept at a certain angle against the plate 1*a* of the light transmitting panel 1, and on the other hand, in FIG. 10, the bottom faces opposite to the apexes of the refractive columns 2 are kept in contact with the plate 1*a* of the light transmitting panel 1. These refractive columns 2 are located in order that the sunlight at the culmination altitude in summer, i.e., the sunlight pattern S3 with an incident angle of γ against the horizontal plane may be perpendicular to the bottom faces opposite to the apexes of the refractive columns 2. In this state, the winter sunlight pattern S1 with an incident angle of α against the horizontal plane is positively introduced into the interior as refracted light X1, and the vernal and autumnal sunlight pattern S with an incident angle of β against the horizontal plane H is partially intercepted as reflected light Y2 while the balance is introduced as refracted light X2.

The example of FIG. 11 shows a vertically installed light transmitting panel 1 facing almost the south, contrary to the horizontally installed and obliquely installed light transmitting panels 1 described above. The refractive columns 2 are trapezoidal in sectional form, and are overlapped to form a panel. In this example, the summer sunlight pattern S3 is reflected as light Y3 on the optical faces of the refractive columns 2, and is not introduced into the interior. In this case, to prevent the heat generated by the reflected light Y3 in the light transmitting panel 1 from being accumulated, the air layer between the plates 1*a* and 1*b* is reduced in pressure or filled with an inactive gas as described in later examples.

This vertically installed light transmitting panel 1 should preferably have the refractive columns 2 installed except the region corresponding to human eyes' height where an air layer should be formed to allow people see the exterior and the interior through the light transmitting panel.

FIGS. 12 to 15 are functional illustrations of light transmitting panels 1 showing the lighting range adjusting method stated in claim 4.

The lighting range adjusting method of the present invention stated in claim 4 uses a light transmitting panel 1 with plural refractive columns 2 located in parallel to each other. At first, optional sunlight patterns S1, S2 and S3 incident from the sun located differently in altitude or azimuth with incident angles of α, β and γ in reference to altitude or azimuth satisfying the relation of $\alpha<\beta<\gamma$ are selected as the sunlight patterns for adjusting the lighting range, as in the light quantity adjusting method stated in claim 3. Then, the sunlight pattern S1 incident at an angle of α on the light transmitting panel 1, the sunlight pattern S2 with an incident angle of β and the sunlight pattern S3 with an incident angle of γ are refracted in respectively different directions through the refractive columns 2.

The lighting range adjusting method stated in claim 4 is to achieve substantially the same effect as achieved by adjusting the lighting quantity, by using the light transmitting panel to selectively adjust the lighting ranges of the sunlight patterns different in incident angle due to the annual motion and daily motion of the sun. Concretely, the summer sunlight pattern S3 large in the quantity of heat is not allowed to be directly introduced into the main region of the interior space, and on the other hand, the sunlight patterns S1 and S2 in the other seasons are positively introduced into the main region of the interior space as far as possible.

The light transmitting panel 1 includes many design modifications of the refractive columns 2 as illustrated in the schematic illustrations of FIGS. 12 to 15.

Figure 12:
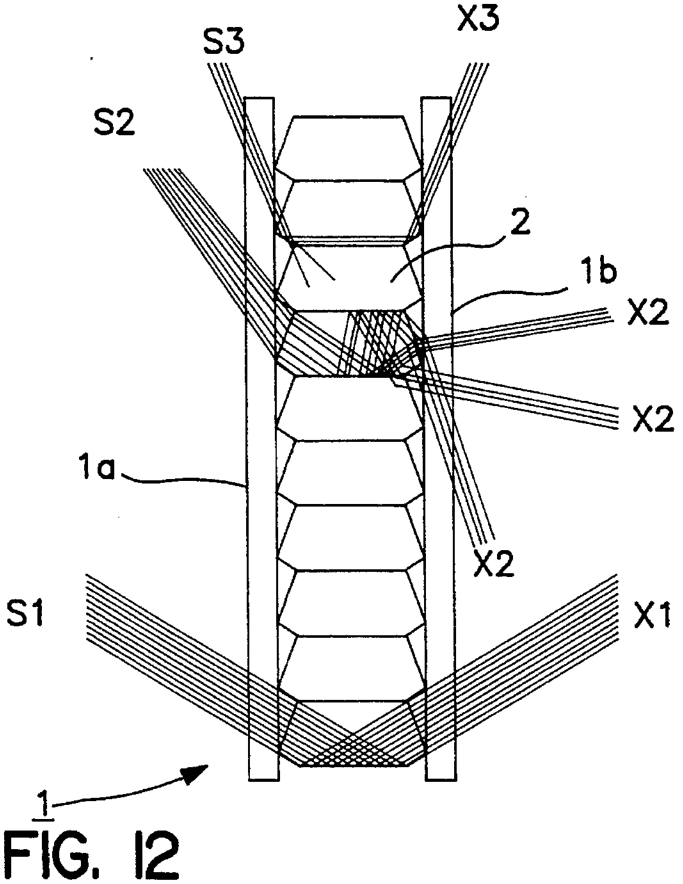
FIGS. 12, 13, 14 and 15 are functional illustrations showing the light range adjusting method of the present invention.

In the example of FIG. 12, the winter sunlight pattern S1 small in the quantity of heat is mostly introduced as slightly upword refracted light X1 in the interior space, and the vernal and autumnal sunlight pattern S2 is mostly introduced as dispersed refracted light X2 and X2, while the summer sunlight pattern S3 large in the quantity of heat is introduced as upward refracted light X3 toward the ceiling, etc.

Figure 13:
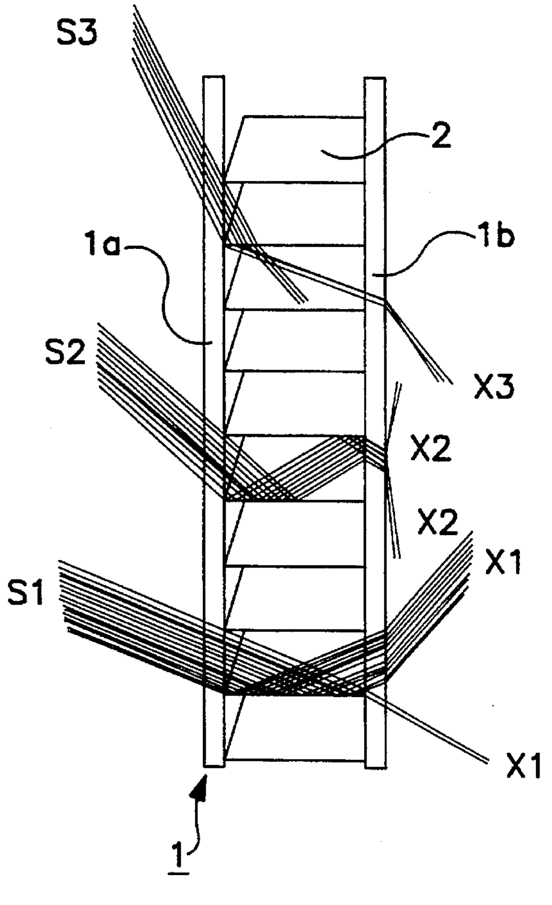

In the example of FIG. 13, the winter sunlight pattern S1 small in the quantity of heat is introduced mostly as slightly upward refracted light X1 and partially as downward refracted light X1 in the interior space, and the vernal and autumnal sunlight pattern S2 is mostly dispersed and introduced as downward refracted light X2 in the interior space, while the summer sunlight pattern S3 large in the quantity of heat is partially reflected and introduced as refracted light X3.

Figure 14:
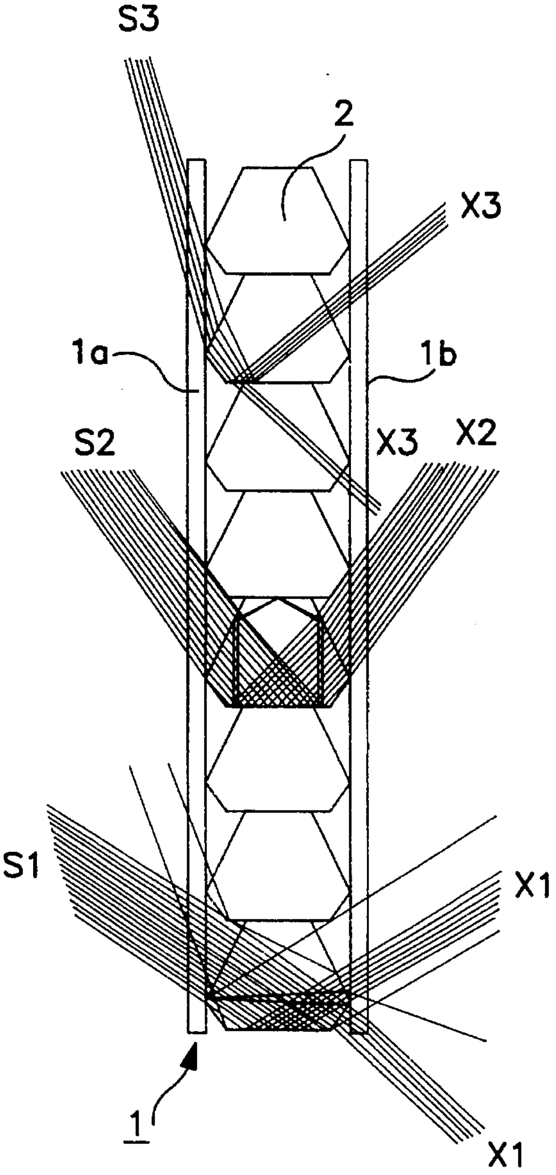

In the example of FIG. 14, the winter sunlight pattern S1 small in the quantity of heat is mostly dispersed and introduced as refracted light X1 in the interior space, and the vernal and autumnal sunlight pattern S2 is mostly introduced as upward refracted light X2 in the interior space, while the summer sunlight pattern S3 large in the quantity of heat is introduced partially as downward refracted light X3 and partially as upward refracted light X3.

Figure 15:
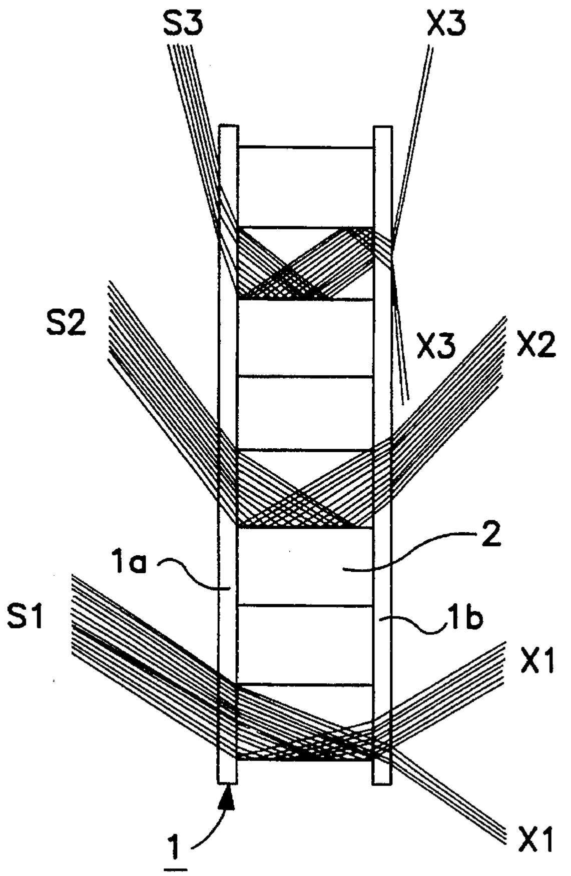

In the example of FIG. 15, the winter sunlight pattern S1 small in the quantity of heat is mostly dispersed and introduced as downward refracted light X1 in the interior space, and the vernal and autumnal sunlight pattern S2 is mostly introduced as slightly upward refracted light X2 in the interior space, while the summer sunlight pattern S3 large in the quantity of heat is introduced as upward refracted light X3 toward the ceiling, etc. and partially as downward refracted light X3.

The light transmitting panels 1 using refractive columns 2 stated in claims 1 and 2 of the present invention are composed as described in the above examples. Especially the lighting quantity or range adjusting method stated in claim 3 or 4 includes to use the light transmitting panels 1 with functionally improved structures described in the following respective examples shown in FIGS. 16 to 37.

Figure 16:
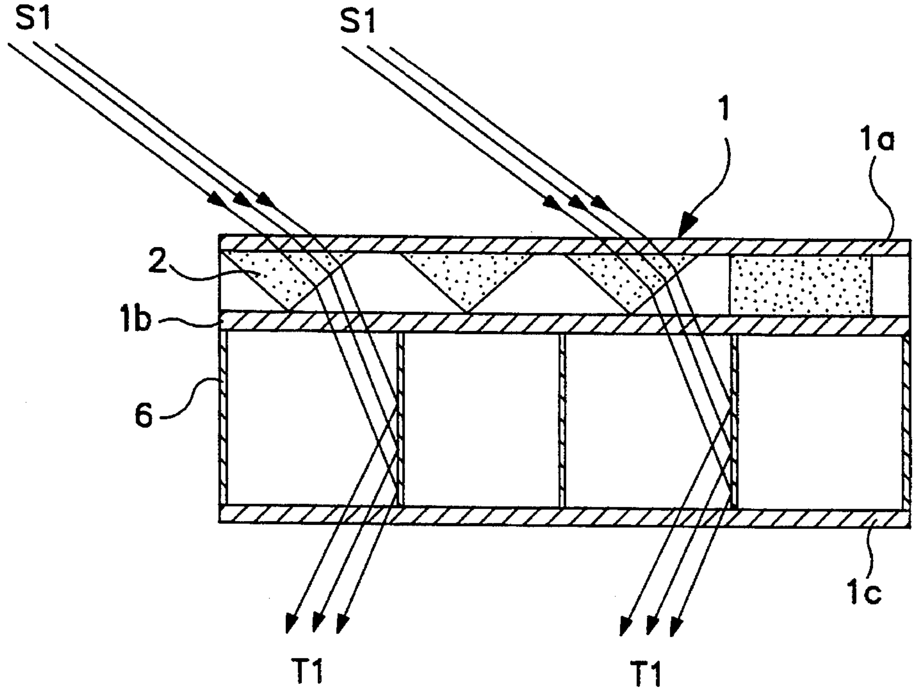
FIGS. 16–37 are schematic illustrations showing other examples of the light transmitting panels of the present invention and light transmitting panels used for light quantity and range adjusting methods of the present invention.
Figure 17:
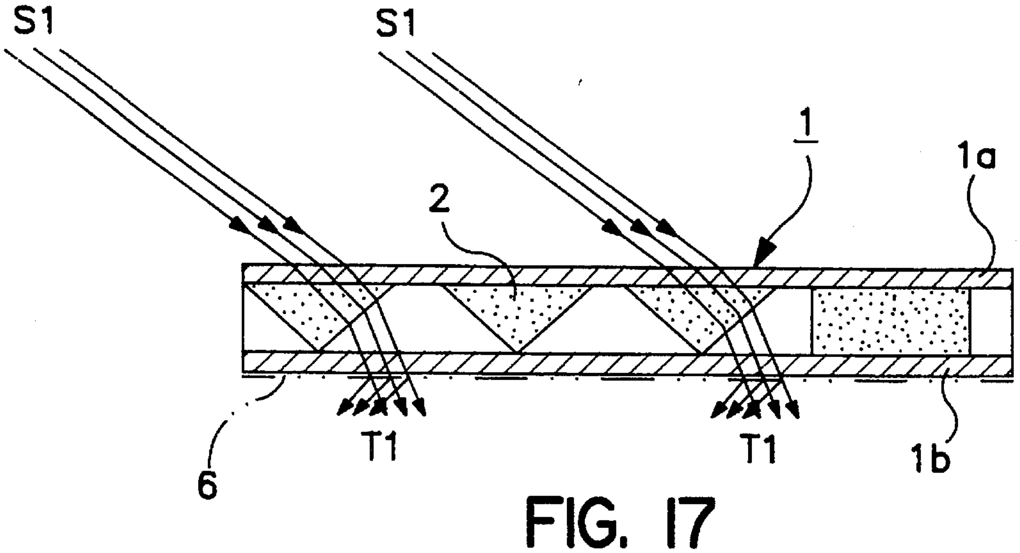

The examples of FIGS. 16 and 17 have a light control section 6 composed of various members attached to the plate 1*b* installed on the interior side.

The light transmitting panel of FIG. 16 has a lattice louver or honeycomb louver with metallic reflecting faces made of aluminum, etc. as the reflected light control members constituting the light control section 6. If the light transmitting panel 1 is used as a lighting window at a ceiling, etc., the sunlight pattern S1 transmitted through the refractive columns 2 is reflected by the light control members 6, being turned into interior light T1 progressing in the direction almost perpendicular to the plate 1*b* of the light transmitting panel 1, for creating a soft atmosphere in the interior space. The reflected light control members constituting the light control section 6 can be provided at a proper angle by a proper means. In this example, they are provided in the direction perpendicular to the plate 1*b*, being held between the plate 1*b* and a plate 1*c*.

The light transmitting panel 1 of FIG. 17 uses a glass sheet as the plate 1*b* installed on the interior side, and the plate 1*b* has fine undulations formed on the surface, to constitute the light control section 6 with a non-reflecting surface. If the light transmitting panel 1 is used as a lighting window at a ceiling, etc., the sunlight pattern S1 transmitted through the refractive columns 2 is scattered by the light control section 6 into interior light T1, to create a soft atmosphere in the interior space like the light transmitting panel 1 of FIG. 16.

If the light control section 6 is provided for the other plate 1*a*, the sunlight pattern S1 incident on the light transmitting panel 1 is somewhat changed in incident angle and transmitted through the refractive columns. In this case, the same effect as achieved when the light control section 6 is provided for the plate 1*b* can be achieved, and in addition, since the reflected light from the surface is divided, a soft decorative effect can be achieved. The light control section 6 in the example of FIG. 17 can also be provided on the refractive columns side of the plate 1*a* or l*b*.

In the examples of FIGS. 18 to 21, transparent portions 5 are formed between the respective refractive columns 2 or by specially locating or designing the refractive columns 2, so that people can see the exterior and the interior through the light transmitting panel 1.

Figure 18:
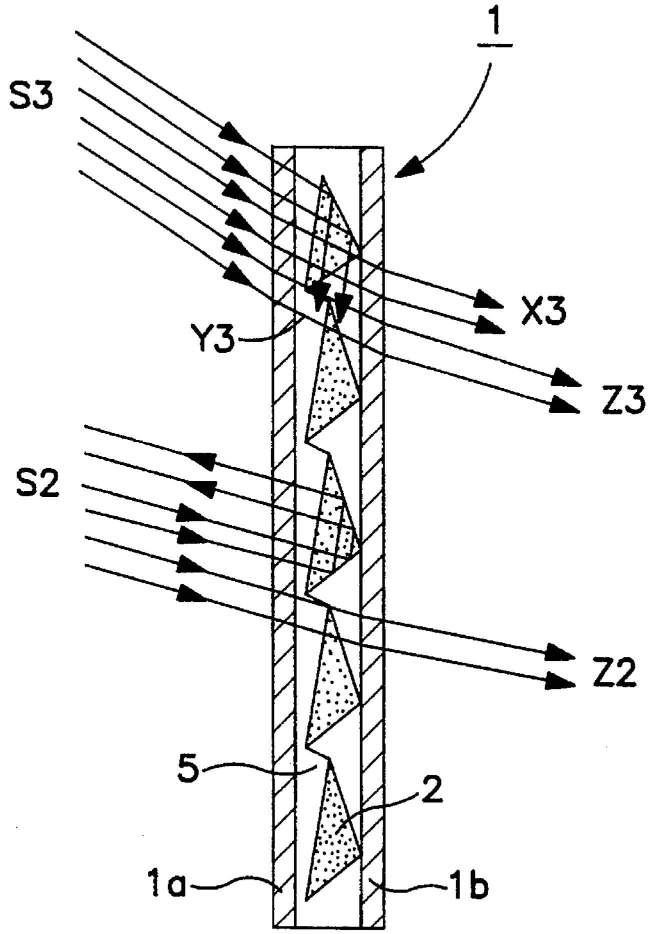
Figure 19:
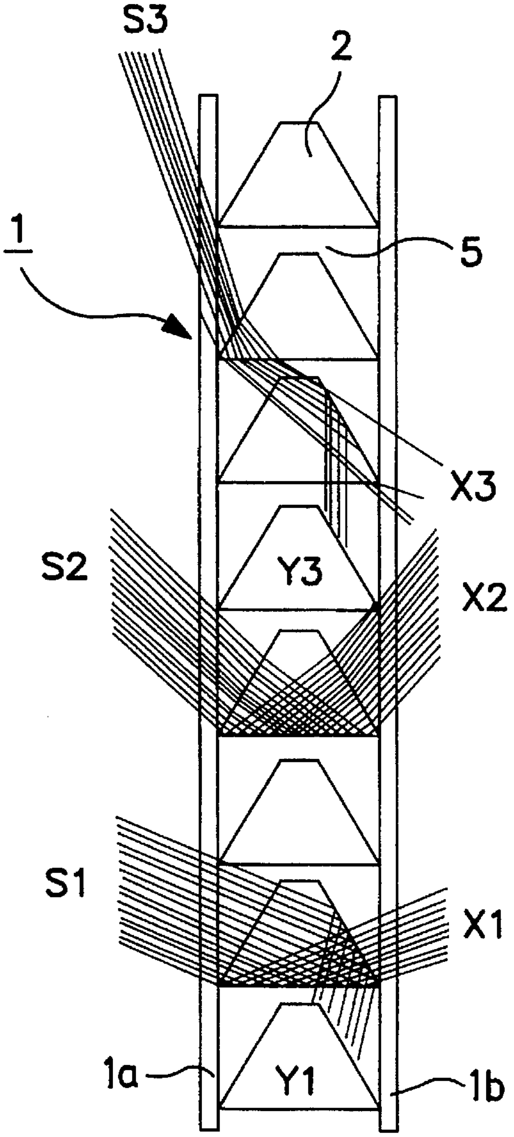

The light transmitting panels 1 of FIGS. 18 and 19 form the transparent portions 5 by forming clearances between the respective refractive columns 2 using holders (not illustrated).

The light transmitting panel 1 of FIG. 18 is vertically installed in a lighting window on the west side, to allow people to see the exterior and the interior through the light transmitting panel 1. Especially when it is used in a lighting window on the west side in summer, the rise in the quantity of heat gradually accumulated during daytime can be suppressed. FIG. 18 shows the sunlight pattern S3 occurring three hours before sunset, and the sunlight pattern S2 occurring at sunset. The sunlight pattern S3 is partially reflected as reflected light Y3 and is also introduced as refracted light X3 and transmitted light Z3, and the sunlight pattern S2 is partially reflected as reflected light Y2 and is introduced as transmitted light Z2.

Figure 20:
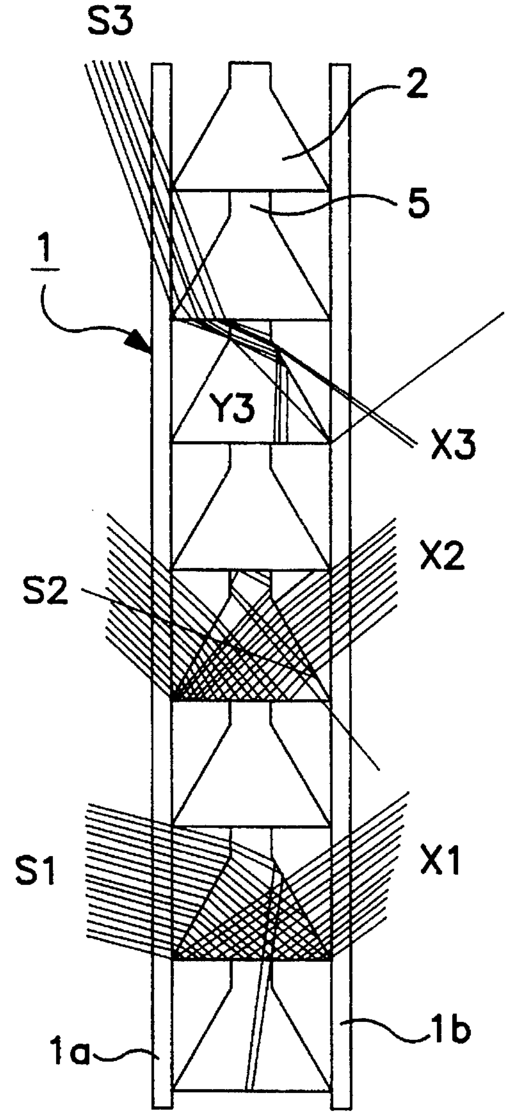
Figure 21:
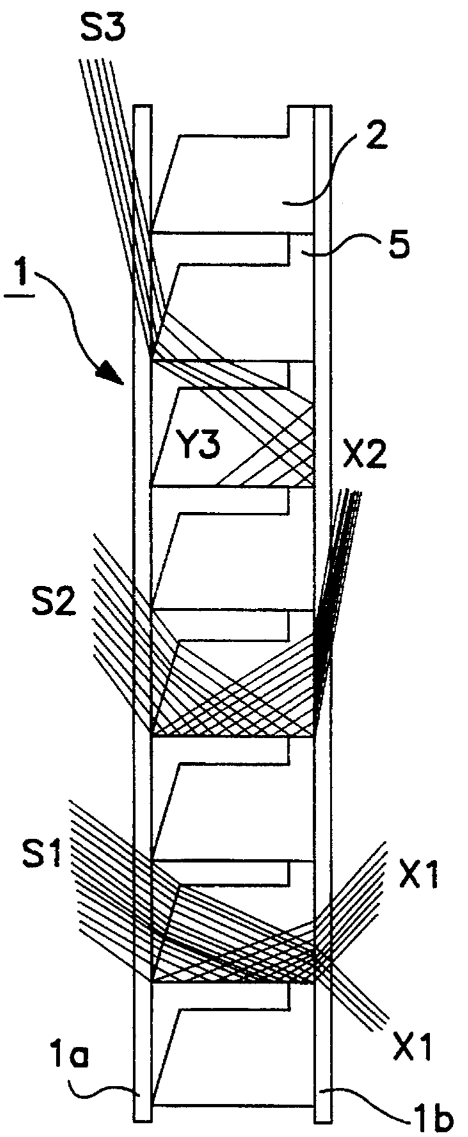

The light transmitting panels 1 of FIGS. 20 and 21 have protrusions acting also as holders formed at the ends of the respective refractive columns 2, and with the refractive columns 2 overlapped, the protrusions are provided as transparent portions 5. In these examples, the refractive columns 5 connected at the protrusions can be integrally molded. If the joints provided as tile transparent portions 5 are made smaller to less affect the light output, the summer sunlight pattern S3 can be reflected as reflected light Y3.

Figure 22:
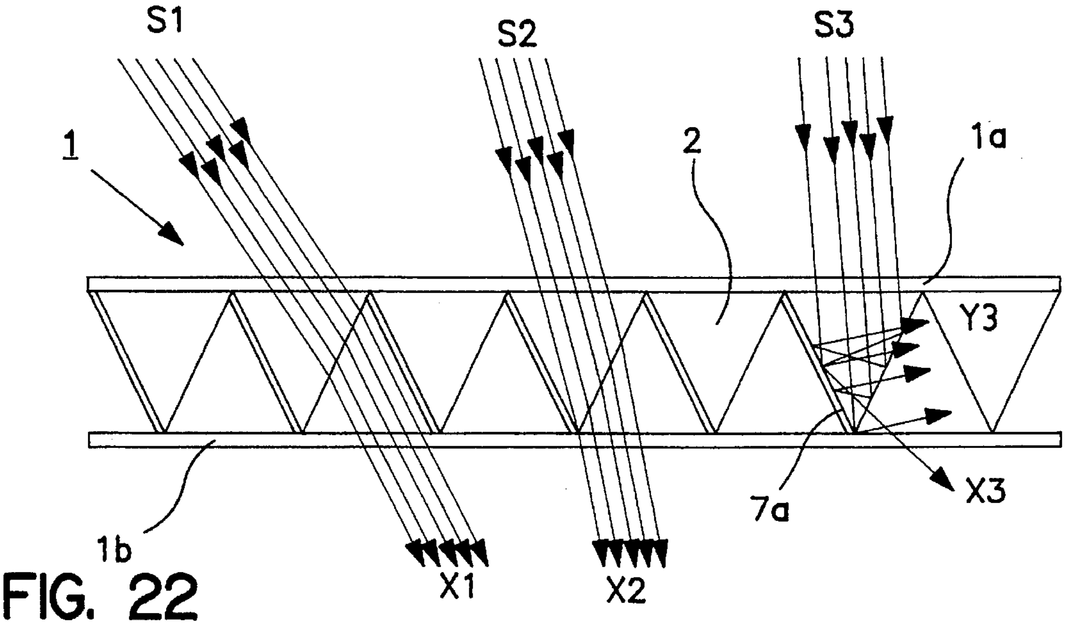

The example of FIG. 22 has reflectors 7*a* formed by a vapor-deposited film of a metal such as aluminum on the optical faces of the refractive columns 2. The reflectors 7*a* make the sunlight pattern S3 with a certain incident angle reflected as reflected light Y3 by total reflection, to prevent the summer sunlight from going into the interior, and on the other hand, the winter sunlight pattern S1 and the vernal and autumnal sunlight pattern S2 are introduced as refractive light X1 and X2 respectively.

Figure 24:
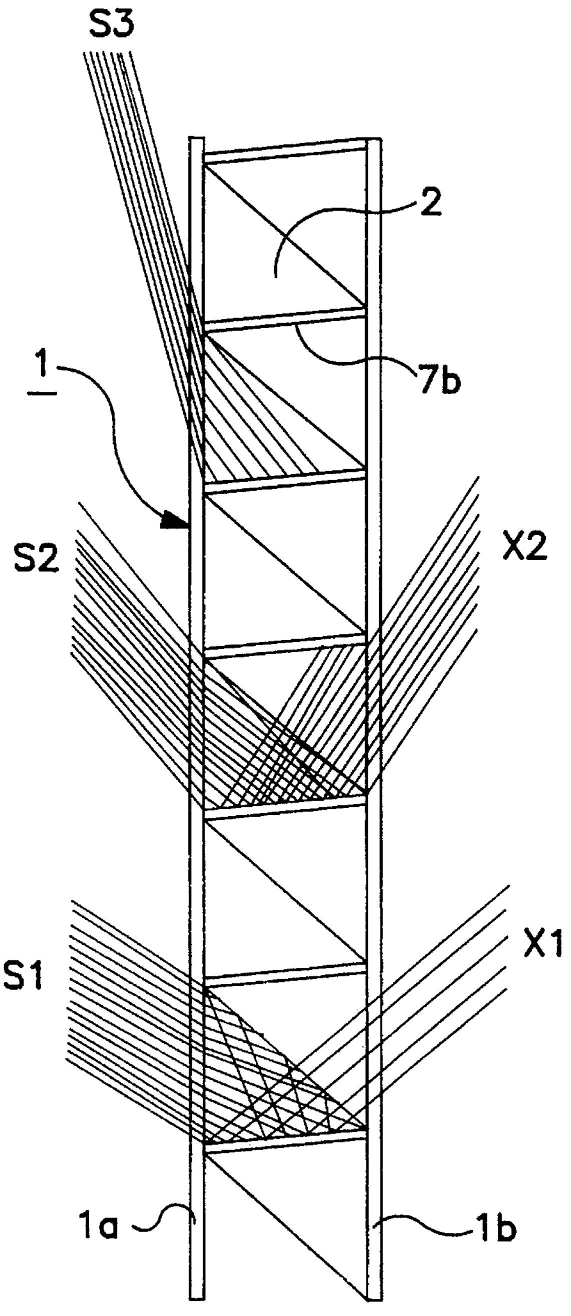
Figure 23:
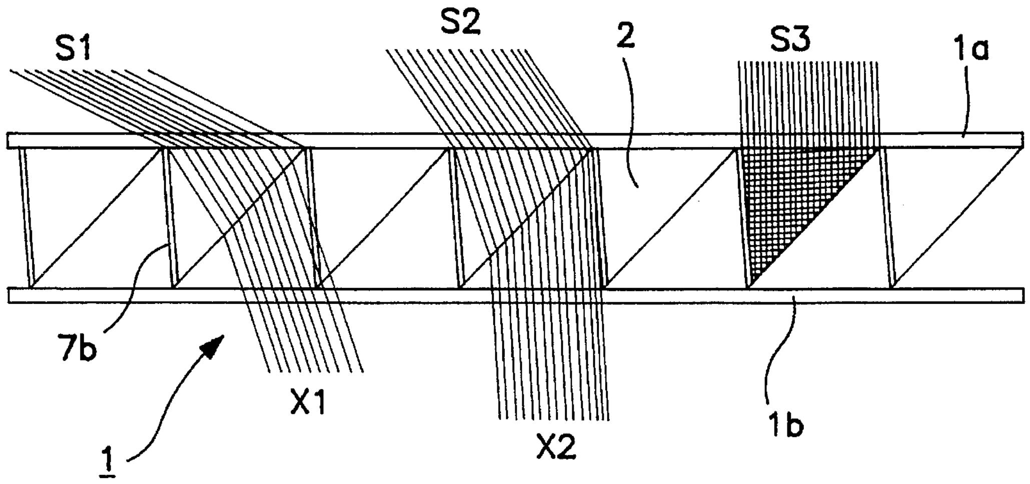
Figure 25:
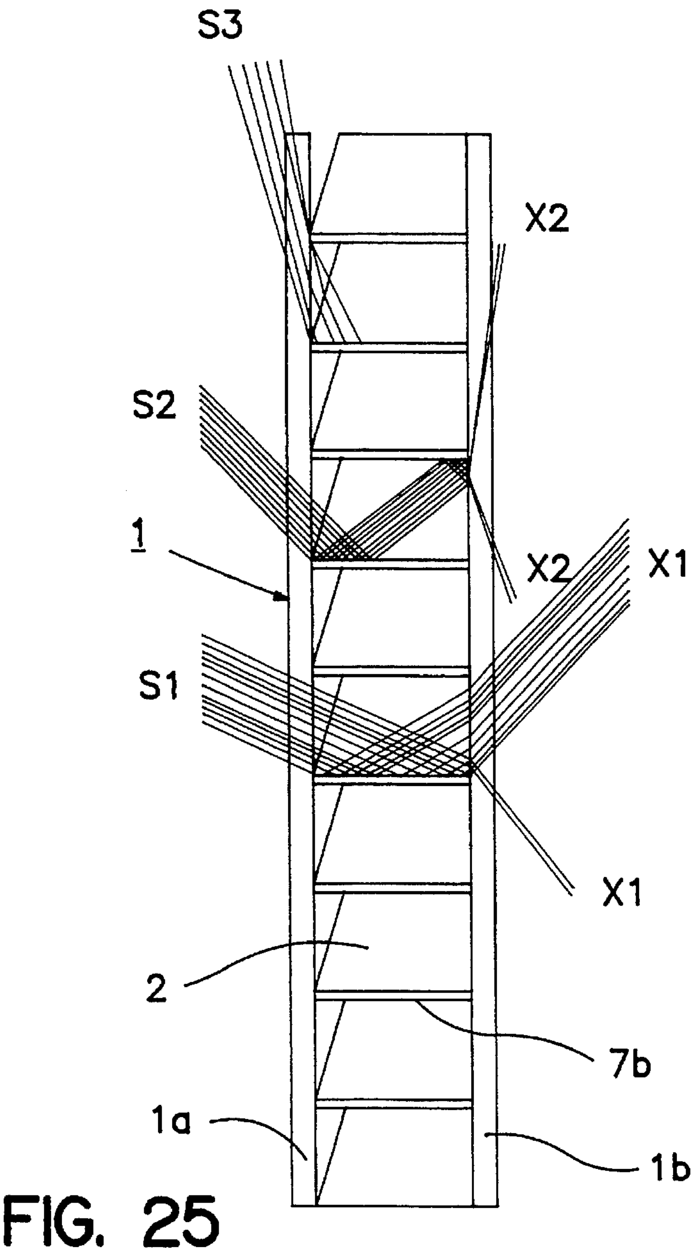

The examples of FIGS. 23 to 25 have absorbers 7*b* formed on the optical faces of the refractive columns 2 for preventing the reflection of the sunlight pattern S3 with a certain incident angle. The absorbers 7*b* can be provided, for example, by forming a thin calcium fluoride film by vapor deposition onto the optical faces of the refractive columns 2. Since the absorbers 7*b* absorb the sunlight pattern S3 with a certain incident angle, the summer sunlight pattern S3 can be intercepted, and on the other hand, the winter sunlight pattern S1 and the vernal and autumnal sunlight pattern S2 can be introduced as refracted light X1 and X2 respectively.

Figure 26:
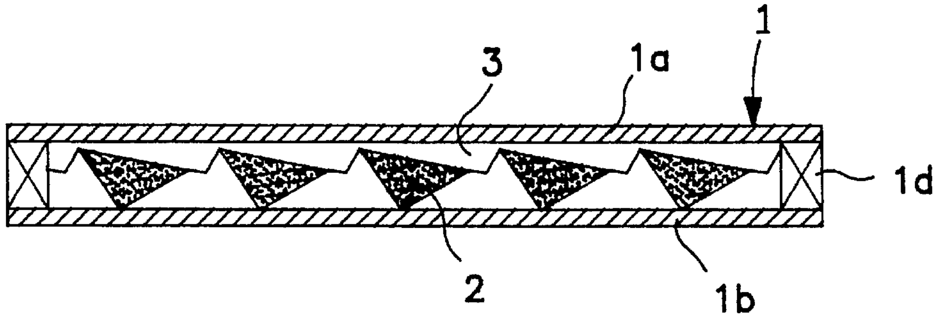

The example of FIG. 26 has an inactive gas lower in overall heat transfer coefficient than air such as argon or sulfur hexafluoride injected into the air layer between the plates 1*a* and 1*b* from an injection hole, etc. formed in the seal 1*d*. The inactive gas improves the heat insulation effect of the light transmitting panel 1, and the plates 1*a* and 1*b* of the light transmitting panel 1 on the air layer side, the optical faces of the refractive columns 2, the seal 1*d* and the holders 3 are kept in contact with the inactive gas, to be enhanced in durability. If the enhancement in the durability of parts is mainly intended instead of improving the heat insulation effect of the light transmitting panel 1, any inactive gas such as xenon, nitrogen, carbonic acid gas, neon or hydrogen can be properly selected irrespective of the overall heat transfer coefficient.

Figure 27:
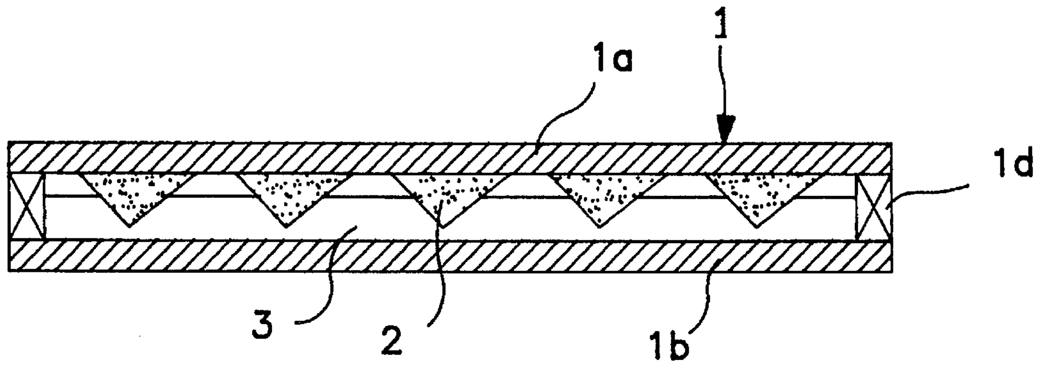

The example of FIG. 27 has the pressure in the air layer reduced from a suction port, etc. formed in the seal 1*d*. Under reduced pressure, the air in the air layer is lowered in overall heat transfer coefficient, to enhance the heat insulation effect of the light transmitting panel 1. The plates 1*a* and 1*b* are effectively prevented from being deformed by the reduced pressure, thanks to the seal 1*d* and the holders 3 provided at the edges, and if the light transmitting panel 1 is large in area, also thanks to the holder 3 and the refractive columns 2 provided at intermediate portions.

Figure 28:
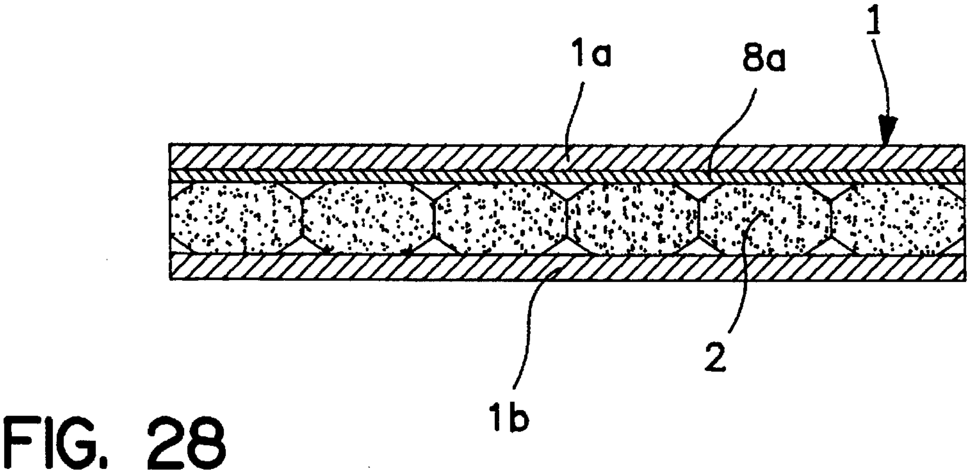

The example of FIG. 28 has a heat reflecting film 8*a* made of an aluminum vapor-deposited film, etc. formed on the plate 1*a* on the outdoor side or the refractive columns side or on the plate 1*b* on the indoor side or the refractive columns side. The heat reflecting film 8*a* generally decreases the light introduced into the interior and lessens the leak of light and the influence of turbulent light by the refractive columns 2, and since the spectral transmission factor lessens the transmittance in the infrared wavelength range large in the quantity of heat unlike the case of glass component only, the heat insulation effect of the light transmitting panel 1 can be improved. If the heat reflecting film 8*a* is formed on the outdoor side of the plate 1*a*, the lighting quantity is decreased to give the effect of interception, for improving the durability of the refractive columns 2.

If the plate 1*a* of the light transmitting panel 1 on the outdoor side or on the refractive columns side or the plate 1*b* on the indoor side or on the refractive columns side is processed to be non-reflecting on the surface (not illustrated), the reflection and glare peculiar to the heat reflecting film 8*a* can be eased.

Figure 29:
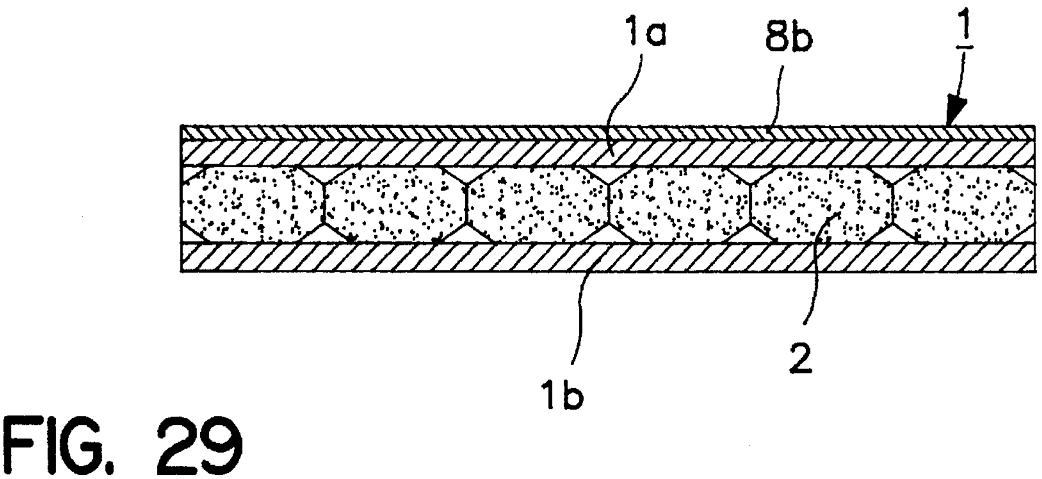

The example of FIG. 29 has an antifouling film 8*b* formed by a proper means such as spraying a special liquid resin onto the plate 1*a* on the outdoor side or onto the plate 1*b* on the indoor side.

Figure 30:
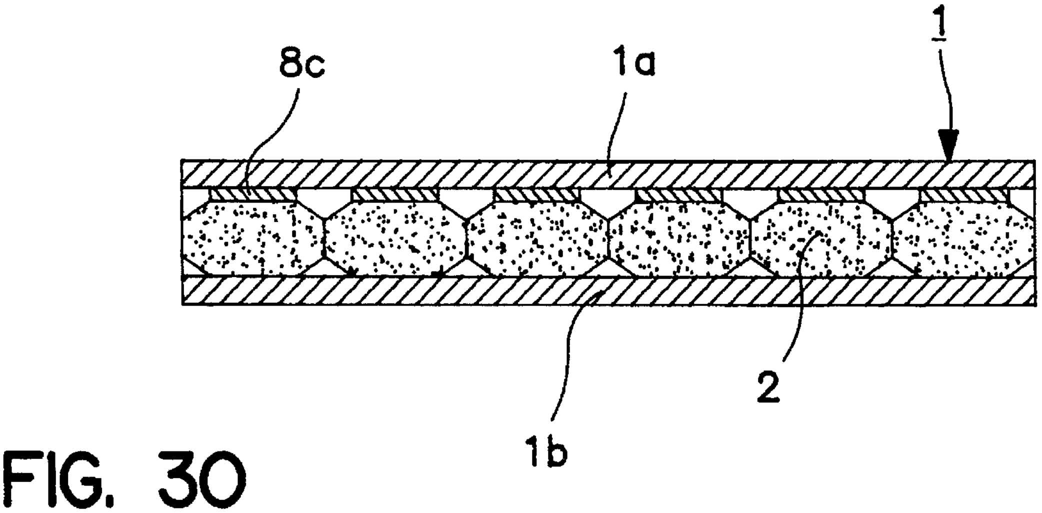

In the example of FIG. 30, the refractive columns 2 are made of a special material or designed as a special structure or covered with a special film on the optical faces, to change the intensity, relative spectral distribution, vibration face, etc. of sunlight, to have an optical filter function for absorbing or reflecting part of visible light and infrared light, in the lighting adjustment of sunlight for selectively introducing the light with desired wavelengths. The filter function can be provided, for example, by using colored glass, resin or crystal, etc. as the refractive columns, or forming a single-layer or laminated selective transmitting film or selective absorbing film 8*c* made of a metal, dielectric or neodymium compound, etc. on proper optical faces of the refractive columns 2. Especially if a material or structure for absorbing or reflecting infrared light is used, the heat insulation effect of the light transmitting panel 1 can be improved.

Figure 31:
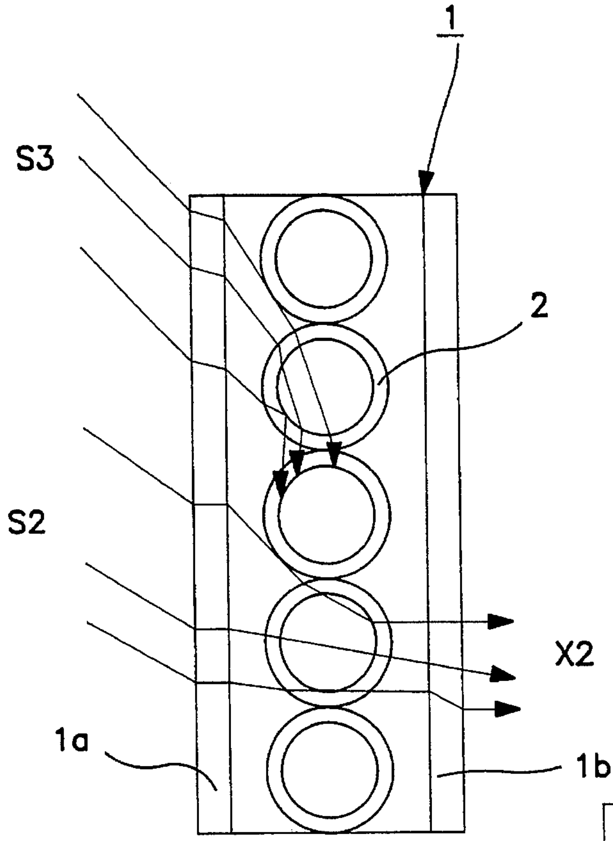

The example of FIG. 31 has the refractive columns 2 formed as hollow pipes. The refractive columns 2 can be overlapped in a single line if their diameter is equal to the width of the air layer, or can be overlapped in plural lines if they are hollow pipes smaller in diameter. Since the refractive columns 2 are circular or approximately circular in section, they can be held in line contact with each other and with the two plates 1a and 1*b*, and the holders exclusively used for holding the refractive columns 2 are not required to be used. Some clearances can be easily formed between the refractive columns 2 and the two plates 1*a* and 1*b* by locating holders as thick as tile intended clearances at the ends of the refractive columns 2 on both sides. Even when clearances are desired to be formed between the respective refractive columns 2 (not illustrated), this can be achieved without any trouble without changing the optical effect, for example, by locating holed holders at the ends of the refractive columns 2 on both sides. Since the refractive columns 2 are pipes, they are not required to be decided in rotary position.

Said refractive columns 2 can be ordinary transmitting pipes, and in this case, if the refractive columns 2 are connected with each other with a heating medium such as water circulated in them, the light transmitting panel 1 can be effectively used as a solar energy collector for a solar system. If the light transmitting panel 1 is used on a wall, the summer sunlight pattern S3 large in the quantity of heat can be positively intercepted as reflected light Y3. On the other hand, the sunlight pattern S2 of the season small in the quantity of heat can be fully introduced as reflected light X2.

Figure 32:
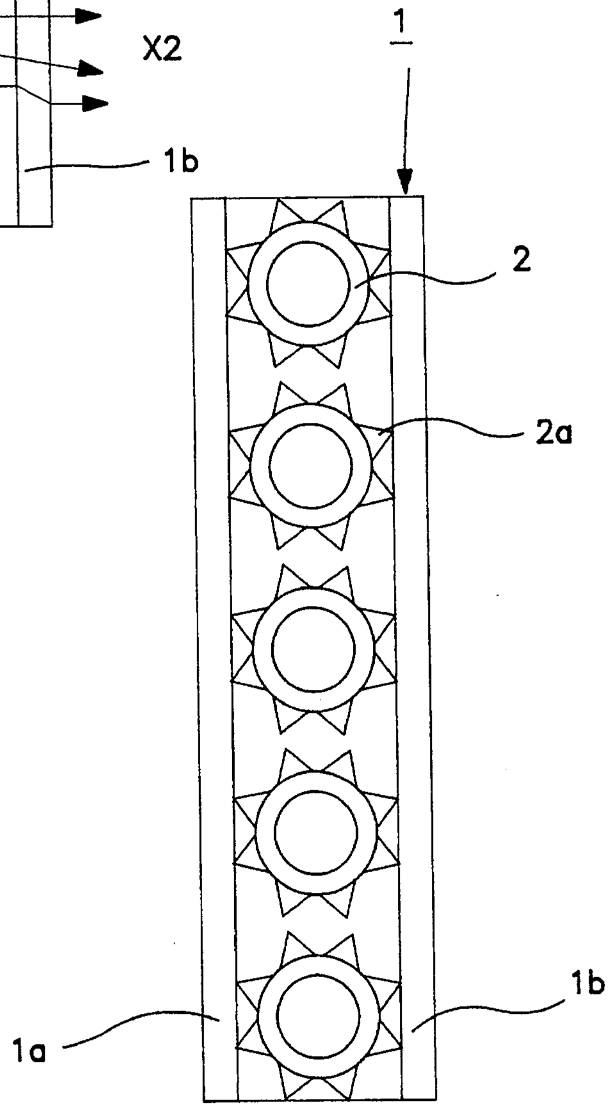

The example of FIG. 32 has plural projections 2*a* around each of the refractive columns 2 of FIG. 31 in the axial direction. The projections 2*a* make the refractive columns 2 and the plates 1*a* and 1*b* engaged and also the respective refractive columns engaged with each other, and on the other hand, generate complicated refracted light.

Figure 33:
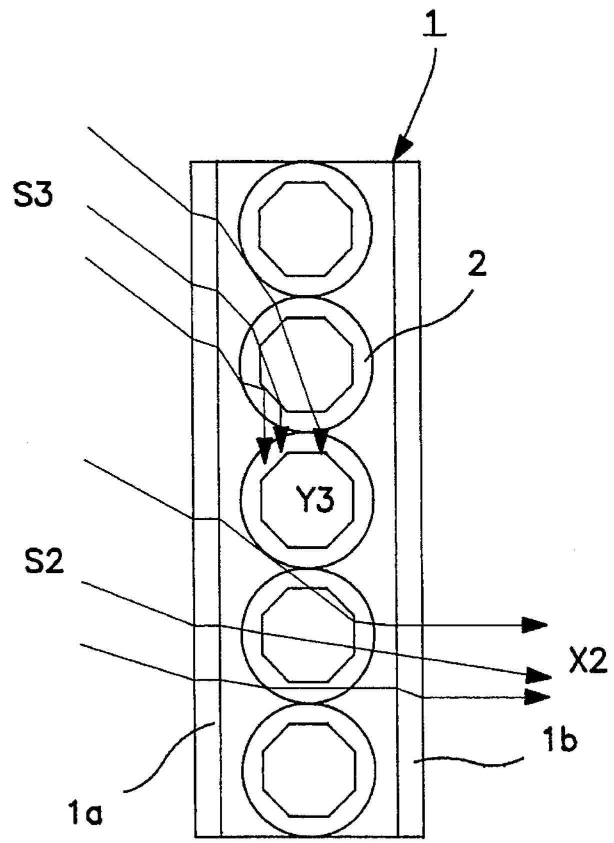
Figure 34:
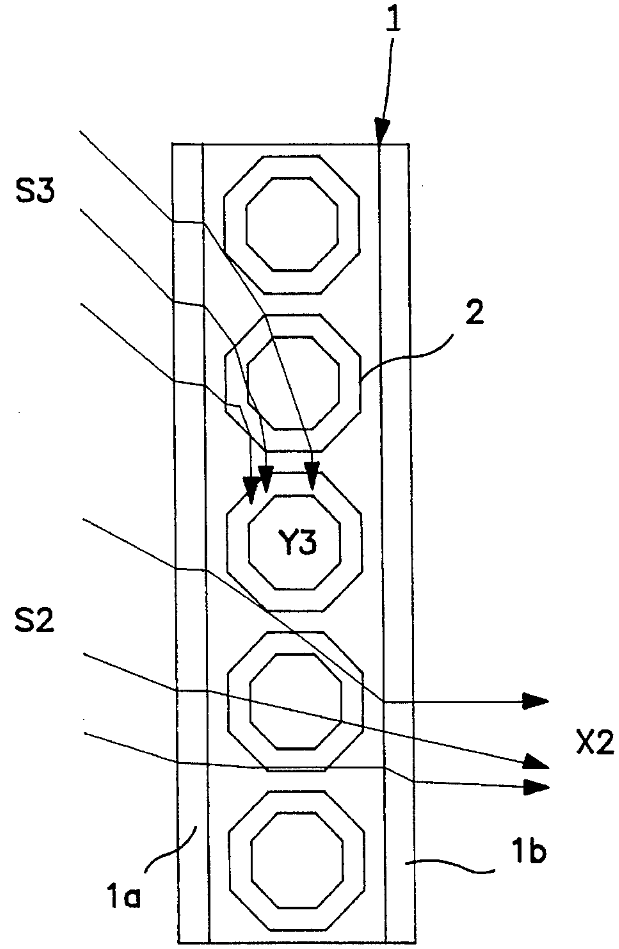
Figure 35:
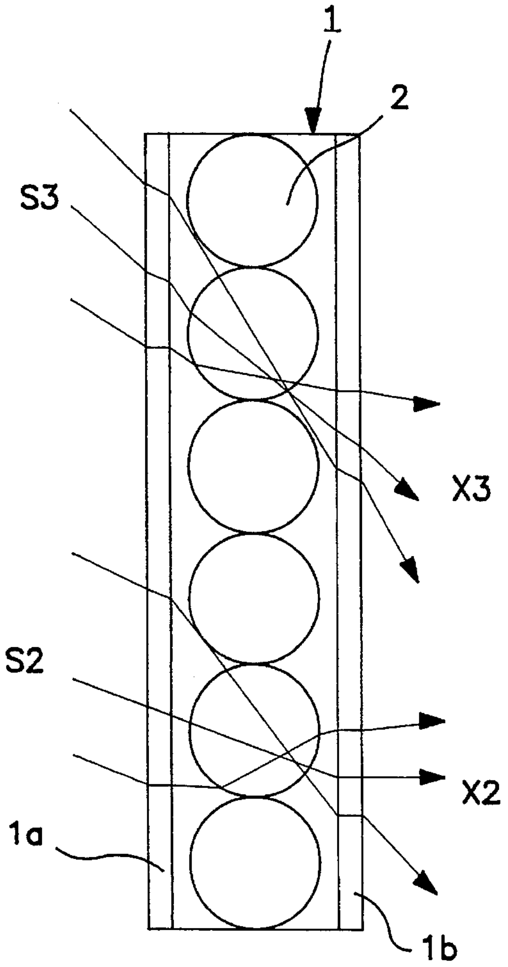
Figure 36:
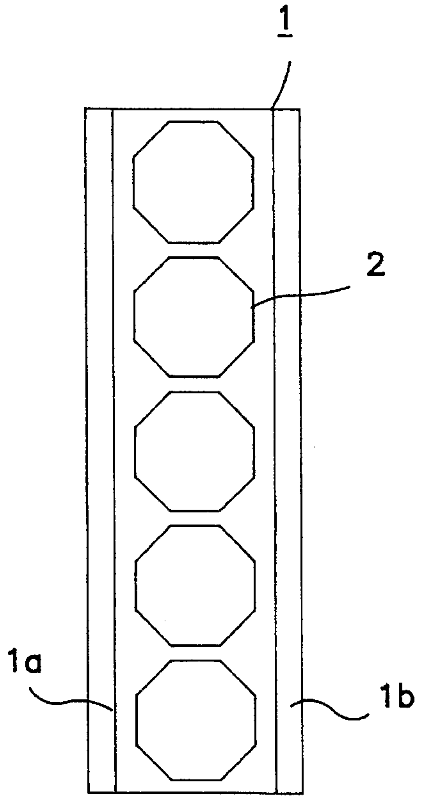

The example of FIG. 33 has the refractive columns 2 circular in outside profile and polygonal in inside profile, and the example of FIG. 34 has the refractive columns 2 polygonal in both outside and inside profiles. The examples of FIGS. 35 and 36 have almost cylindrical solid members as the refractive columns 2 located to form a panel. The almost cylindrical solid members used as the refractive columns 2 are easy to mold, and can reduce the production cost. When either of the light transmitting panels 1 is used on a wall as illustrated, the summer sunlight pattern S3 large in the quantity of heat can also be positively introduced as refracted light X3. In this case, since the refracted light X3 is refracted downward by the refractive columns 2, to illuminate the floor, etc., the sunlight does not directly irradiate the interior space. In the example of FIG. 35, the solid refractive columns 2 are circular in sectional form, and in the example of FIG. 36, the solid refractive columns 2 have a sectional form of a polygon close to a circle.

Figure 37:
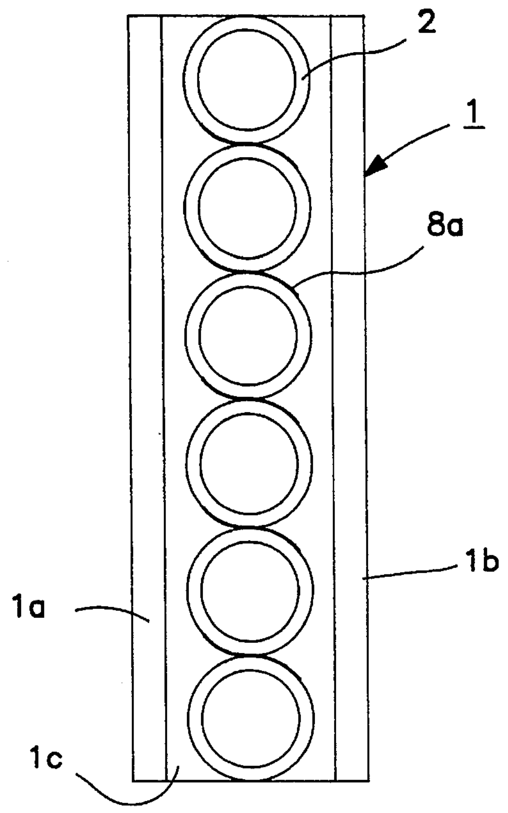

The refractive columns 2 of the above two examples do not require or can be without the holders, like the hollow refractive columns 2, but are different from the hollow refractive columns 2 in optical characteristics. In the example of FIG. 37, the light transmitting panel 1 using the refractive columns 2 circular in cross section have heat reflecting films 8*a* partially on the surfaces facing the exterior and the interior of the refractive columns 2, and the heat reflecting films 81 of the respective refractive columns 2 are combined to form reflectors for intercepting the sunlight with certain angles.

As the reflectors, for example, the heat reflecting films 8*a* are formed partially on the surfaces facing the exterior and the interior of the refractive columns 2 in the axial direction, and the heat reflecting films 8*a* of the respectively adjacent refractive columns 2 are continuously formed to almost obliquely cross the air layer, so that the summer sunlight containing a large quantity of heat can be partially intercepted because of its incident angle.

The heat reflecting films 8*a* decrease the lighting quantity introduced into the interior, and lessen the leak of light and the influence of turbulent light between the respective refractive columns 2, and since the spectral transmission factor lessens the transmittance in the infrared wavelength range large in the quantity of heat unlike the case of glass component only, the heat insulation effect of the light transmitting panel 1 is improved.

FIGS. 38 to 43 are schematic illustrations for illustrating the light transmitting panel 101 stated in claim 5.

Figure 38:
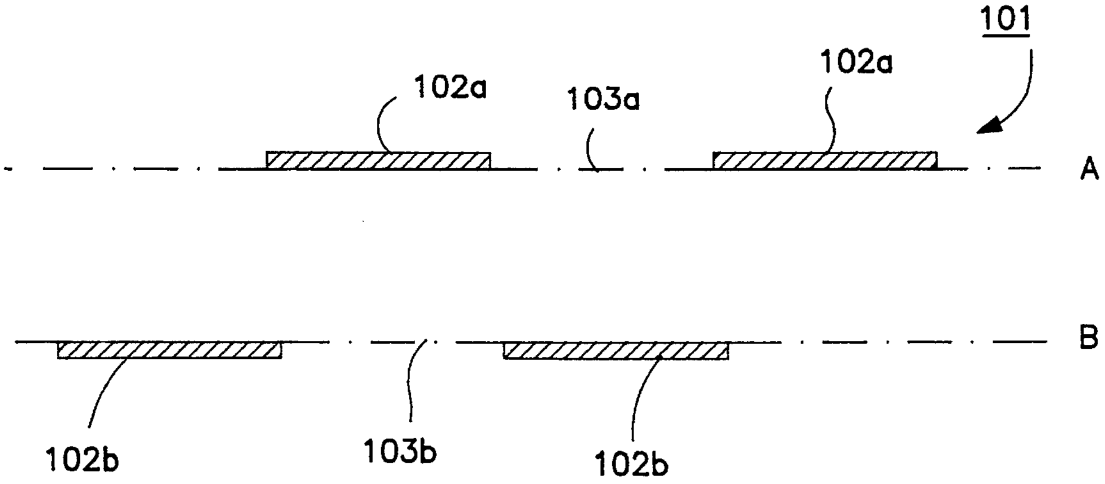
FIG. 38 is a schematic illustration showing a light transmitting panel of the present invention.

The light transmitting panel 101 stated in claim 5 of the present invention has at least two base faces A and B formed to be opposite to each other with a certain transmitting clearance between them, using light transmitting or intercepting bases, as shown in FIG. 38. On one of the base faces, A, first reflecting zones 102*a* parallel to each other are formed alternately with first transmitting zones 103*a* with a certain width, and on the other base face B, second reflecting zones 102 parallel to each other are formed alternately with second transmitting zones 103 with a certain width.

Figure 39:
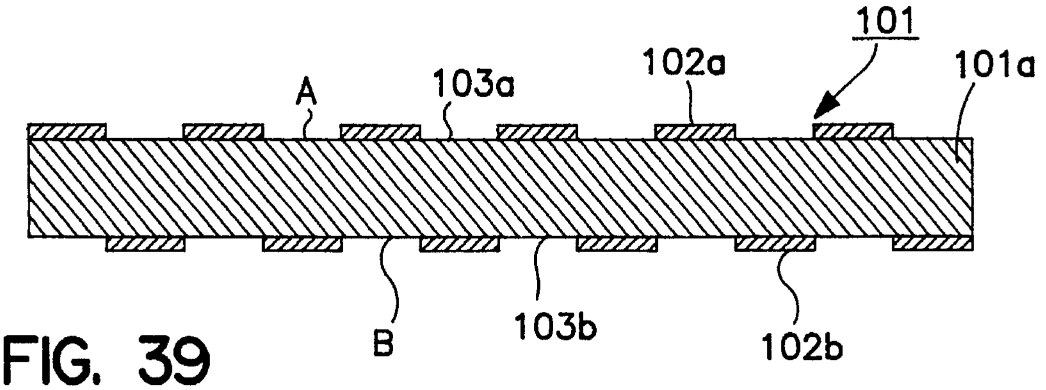
FIGS. 39, 40 and 41 are schematic sectional views showing examples of the light transmitting panels of the present invention.
Figure 40:
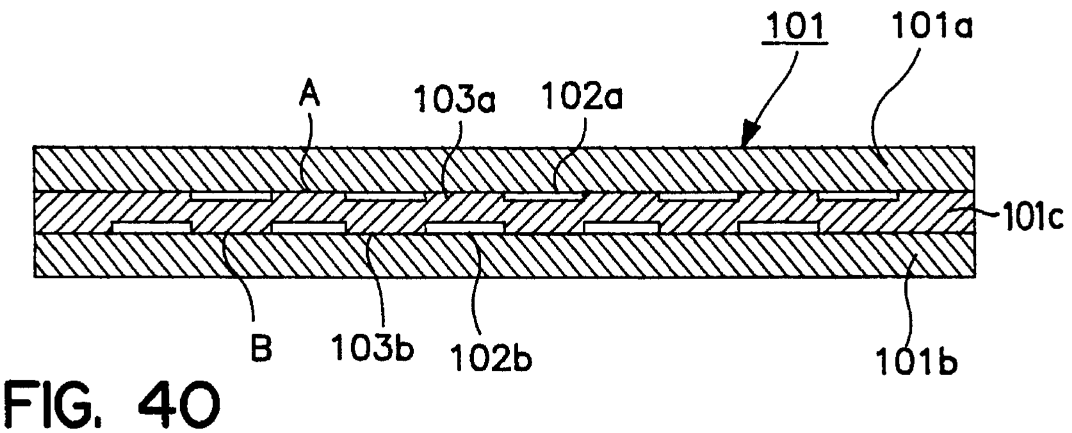
Figure 41:
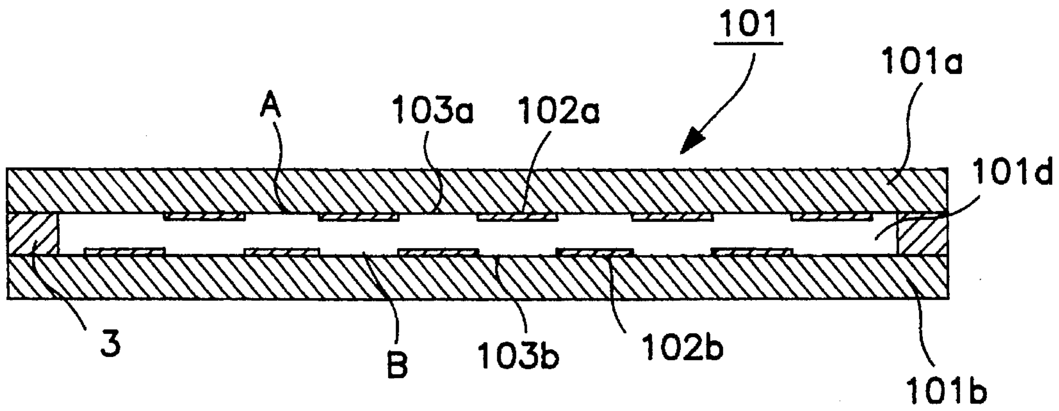
Figure 42:
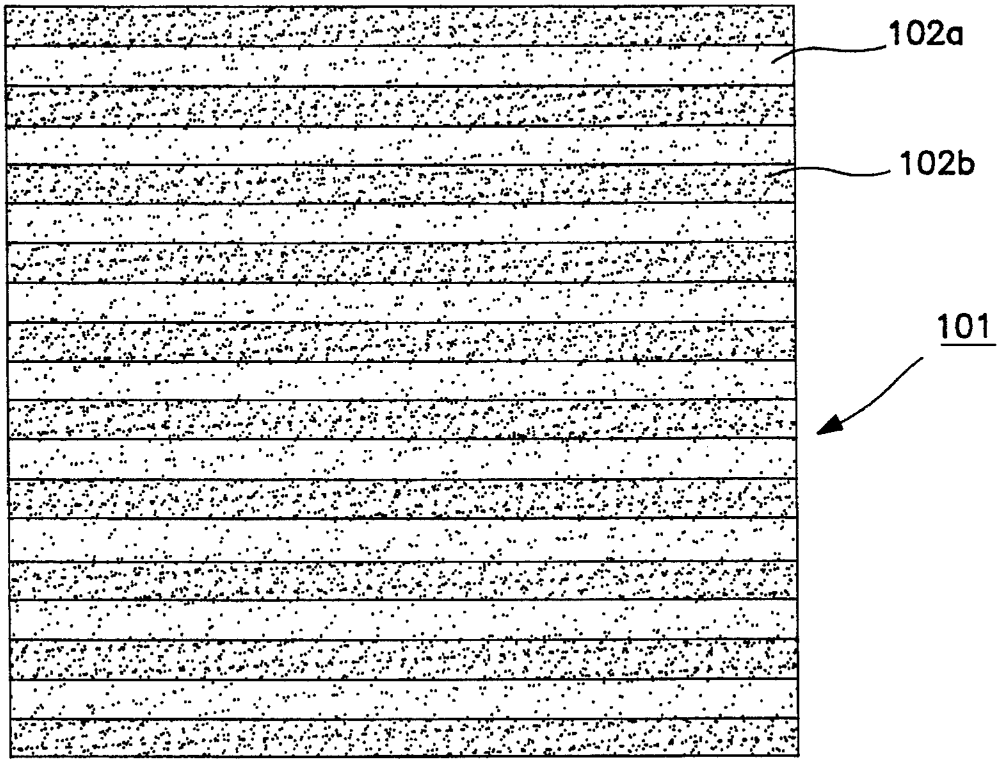
FIG. 42 is a schematic front view showing a further example of a light transmitting panel of the present invention.

Examples of the light transmitting panel 101 stated in claim 5 of the present invention include the light transmitting panels 101 using light transmitting bases as shown in the schematic sectional views of FIGS. 39 to 41. In this case, the light transmitting bases can be float glass plates, figured glass plates or transparent resin plates, etc. used as plates 101*a* and 101*b*, and proper faces of the plates 101*a* and 101*b* can be selected as the base faces A and B. The transmitting zones 103*a* and 103*b* can be formed by using the material of the bases, and on the other hand, the reflecting zones 102*a* and 102*b* can be easily formed by coating such as vapor deposition.

The light transmitting panel 101 of the present invention can also be formed, for example, by using two light intercepting bases (not illustrated) such as metallic sheets with slits formed as the transmitting zones 103*a* and 103*b* in the bases. In this case, the material of the bases can be used to use the other zones than the slits as the reflecting zones 102*a* and 102*b*.

The light transmitting panel 101 illustrated in FIG. 39 is formed by a single layer. One plate 101*a* is used as a light transparent base. With one side of the plate 101*a* as the base face A, the first reflecting zones 102*a* parallel to each other are formed alternately with the first transmitting zones 103*a* with a certain width on the base face A, and on the other base face B, the second reflecting zones 102*b* parallel to each other are formed alternately with the second transmitting zones 103*b* with a certain width.

The first transmitting zones 103*a* and the second transmitting zones 103*b* can be formed by using the material of the base if the base can transmit light as in this example.

The first reflecting zones 102*a* and the second reflecting zones 102*b* can be formed, for example, as reflecting films with a certain reflectance or transmittance such as aluminum vapor deposited films. Therefore, both the incident light on the base face A and the incident light on the base face B can be reflected on the obverse and reverse sides.

The light transmitting panel 101 illustrated in FIG. 40 is laminated. It has two plates 101*a* and 101*b* made of glass, etc. bonded through an intermediate resin layer 101*c* of acrylic resin, etc. With the resin layer 101*c* side of the plate 101*a* as the base face A, the first reflecting zones 102*a* parallel to each other are formed alternately with the first transmitting zones 103*a* with a certain width on the base face A, and with the resin layer 101*c* side of the plate 101*b* as the base face B, the second reflecting zones 102*b* are formed alternately with the second transmitting zones 103*b* with a certain width on the base B.

The light transmitting panel 101 illustrated in FIG. 41 is formed by two layers. The double-layer light transmitting panel 101 has a seal (spacer) 101*e* put between the two plates 101*a* and 101*b* at their edges, to form an air layer between the two plates 101*a* and 101*b*. With the air layer side of the plate 101*a* as the base face A, the first reflecting zones 102*a* parallel to each other are formed alternately with the first transmitting zones 103 with a certain width on the base face A, and with the air layer 101*d* side of the plate 101*b* as the base face B, the second reflecting zones 102*b* are formed alternately with the second transmitting zones with a certain width on the base face B.

Of the light transmitting panels 101 as respective examples of the present invention, the light transmitting panel 101 of FIG. 39 is advantageously light in weight, and the light transmitting panels 101 of FIGS. 40 and 41 have an advantage that since the reflecting zones 102*a* and 102*b* are formed on the intermediate layer 101*c* side or the air layer 101*d* side, the reflecting zones 102*a* and 102*b* can be prevented from peeling to improve durability. Especially the laminated light transmitting panel 101 of FIG. 40 is excellent in mechanical strength and sound insulation due to the action of the resin layer 101*c*, and the light transmitting panel 101 of FIG. 41 is excellent in heat insulation and sound insulation due to the action of the air layer 101*d*.

Therefore, the light transmitting panels 101 of the present invention can be used in a wide range not only for lighting windows in the openings of ceilings, floors, inclined walls, etc. of general buildings but also as any construction materials such as the front panels of decorative walls containing illuminators, and can be installed stationarily or movably for lighting adjustment or decorative effect, by selectively utilizing the respective advantages of these examples.

Figure 43:
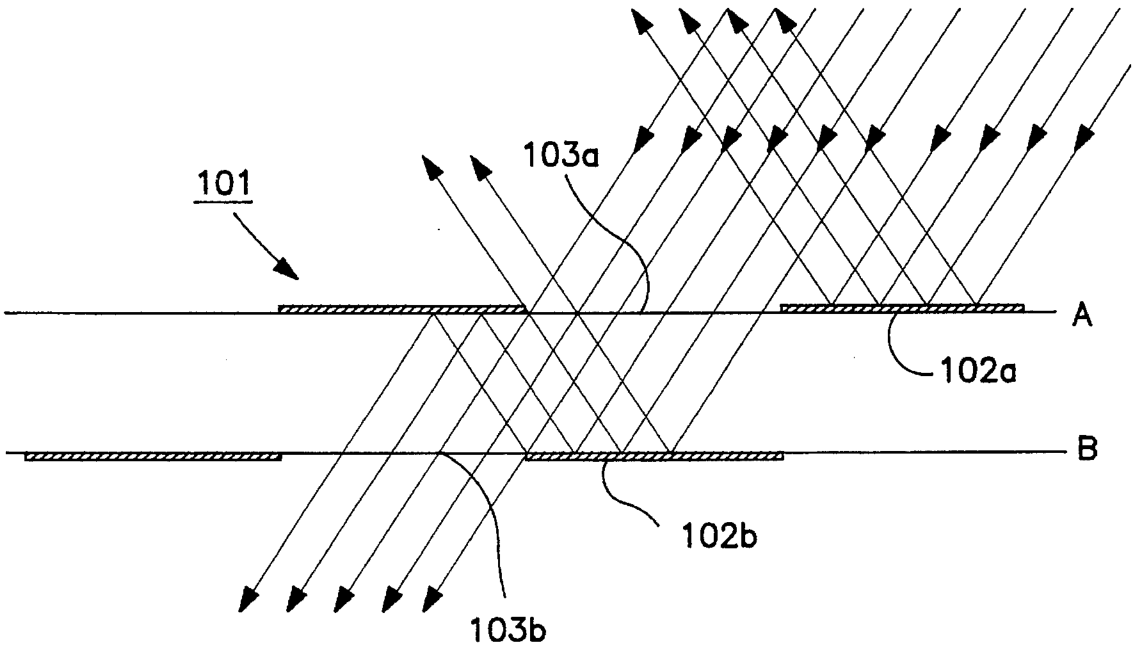
FIG. 43 is a functional illustration showing a light transmitting panel of the present invention.

FIG. 43 is a functional illustration for the light transmitting panel 101 stated in claim 5. The refractive index of the bases and the transmittance of the respective reflecting zones 102*a* and 102*b* are disregarded.

The respective reflecting zones 102*a* and 102*b* formed on the base faces A and B reflect the incident light of sunlight, etc. on the obverse and reverse sides. Therefore, if the light transmitting panel 101 is installed stationarily with the base face A on the outdoor side and with the base face B on the indoor side, the incident light of sunlight, etc. with a predetermined incident angle is divided into the reflected light reflected by the first reflecting zones 102*a* and the transmitted light through the first transmitting zones 103*a* between the first reflecting zones 102*a*.

Then, the transmitted light through the first transmitting zones 103*a* is divided into the reflected light reflected by the second reflecting zones 102*b* and the transmitted light introduced through the second transmitting zones 103*b* into the interior, and furthermore, the reflected light reflected by the second reflecting zones 102*b* is divided into the reflected light transmitted through the first transmitting zones 103*a* toward the exterior and the transmitted light reflected by the backs of the first reflecting zones 102*a* and introduced through the second transmitting zones 103*b* into the interior. These division rates depend on the incident angle of the incident light if such conditions as the locations of the respective transmitting zones 103*a* and 103*b* and the respective reflecting zones 102*a* and 102*b* are constant.

Therefore, in the present invention, the characteristics of the respective reflecting zones 102*a* and 102*b* can be used to partially introduce the incident light falling at a specific angle or to partially concentrate or scatter the incident light, for achieving any desired decorative effect. If such a light transmitting panel stationarily installed in a lighting window is observed by people moving in the interior, the outdoor scenery observed through the transmitting zones 103*a* and 103*b* can be seen as changing images.

The light transmitting panels 101 of the present invention can be used not only as construction materials for lighting windows of general buildings but also as dispersion boards for illuminators such as rotating lamps, as described above. In this case, since the source light is specially scattered, depending on the change in the irradiation range of the source light, the effect of any device of this kind intended for alarming can be enhanced. The first reflecting zones 102*a* and the second reflecting zones 102*b* of the respective examples can be properly designed in layout, width, etc., depending on the desired effect to be achieved.

The light transmitting panels 101 can select the sunlight patterns different in the quantity of heat from season to season and from daily time zone to zone, for adjusting the lighting quantity, according to the light quantity adjusting method disclosed below.

Figure 44:
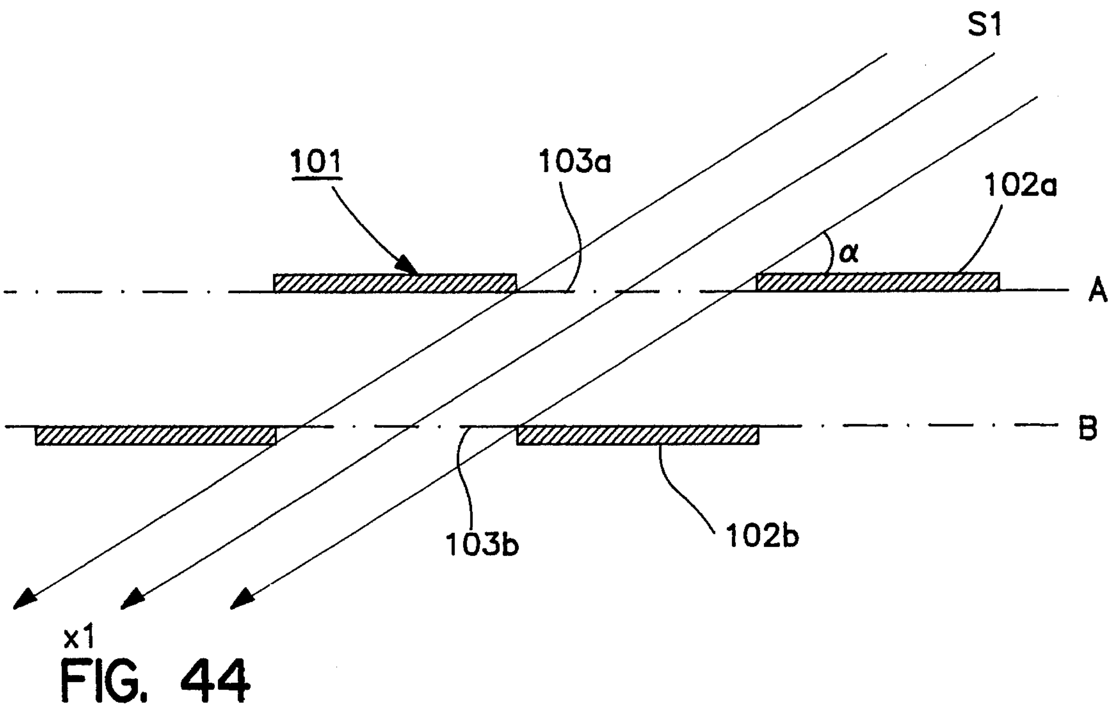
FIGS. 44, 45 and 46 are functional illustrations further showing the light quantity adjusting method of the present invention.
Figure 45:
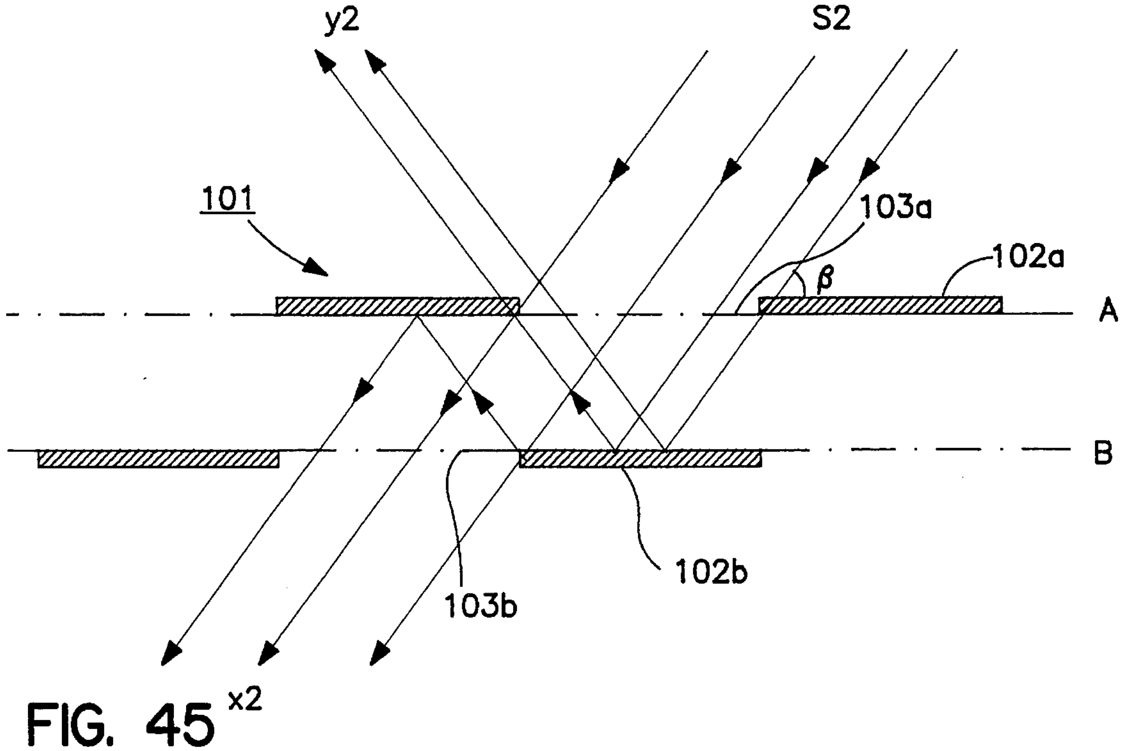
Figure 46:
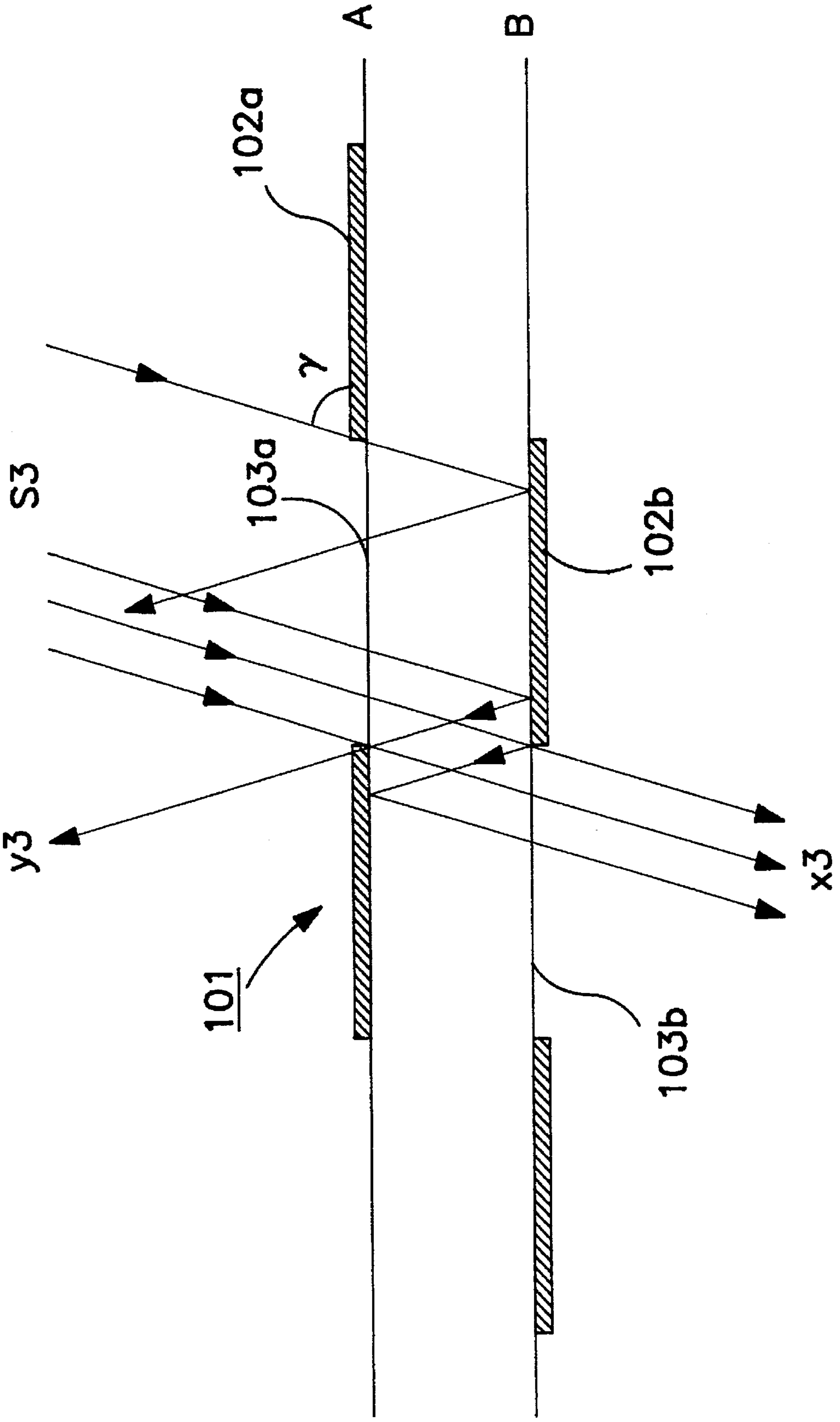

FIGS. 44 to 46 are functional illustrations for the light transmitting panels 101 for illustrating the lighting quantity adjusting method stated in claim 6.

The light quantity adjusting method stated in claim 6 of the present invention uses said light transmitting panel 101 with said first reflecting zones 102*a* and said second reflecting zones 102*b* formed, comprising the step of selecting optional sunlight patterns S1, S2 and S3 incident from the sun located differently in altitude or azimuth with respective incident angles of $\alpha$, $\beta$ and $\gamma$ in reference to altitude or azimuth satisfying the relation of $\alpha<\beta<\gamma$, in order that the sunlight pattern S1 with an incident angle of $\alpha$ incident from first transmitting zones 103*a* can be positively transmitted into the interior as transmitted light x1 through second transmitting zones 103*b*, that the sunlight pattern S2 with an incident angle of $\beta$ incident from the first transmitting zones 103*a* can be reflected by second reflecting zones 102*b*, causing reflected light y2 as part of the reflected light to be transmitted through the first transmitting zones 103*a* toward the exterior for intercepting, and causing the balance of the reflected light to be reflected by the first reflecting zones 102*a* and transmitted through the second transmitting zones 103*b* into the interior as transmitted light x2, and that the sunlight pattern S3 with an incident angle of $\gamma$ incident from the first transmitting zones 103*a* can be positively reflected by the second reflecting zones 102*b* as reflected light y3 and transmitted through the first transmitting zones 103*a* toward the exterior, for intercepting.

The lighting quantity adjusting method stated in claim 6 effectively uses the optical characteristics of the reflecting zones 102*a* and 102*b* for the sunlight patterns S1, S2 and S3, with the light transmitting panel 101 installed horizontally, obliquely, vertically, or at any other proper angle in a lighting window, in more detail, effectively uses the lighting function of introducing light depending on the incident angles of the sunlight patterns S1, S2 and S3 and the intercepting function of intercepting light depending on the respective incident angles.

In a lighting window of a general building, since the location and altitude of the sun depend on the annual motion and daily motion of the sun, mainly sunlight patterns S1, S2 and S3 with respective angles of $\alpha$, $\beta$ and $\gamma$ can be selected, for example, as illustrated in FIGS. 44 to 46. This is as done for the lighting quantity and range adjusting methods disclosed for claims 3 and 4.

In FIGS. 44 to 46, with attention paid to the annual motion of the sun, the sunlight pattern S1 of $\alpha$ in incident angle corresponds to the winter sunlight pattern small in the quantity of heat, and the sunlight pattern S3 of $\gamma$ in incident angle corresponds to the sunlight pattern large in the quantity of heat. The sunlight pattern S2 of $\beta$ in incident angle corresponds to the vernal and autumnal sunlight pattern almost intermediate in the quantity of heat.

Therefore, in the present invention, the quantity of heat obtained in the interior by lighting is effectively adjusted by positively introducing the winter sunlight pattern small in the quantity of heat into the interior, partially introducing the vernal and autumnal sunlight pattern into the interior and positively reflecting the summer sunlight pattern large in the quantity of heat toward the exterior.

In the functional illustrations of FIGS. 44 to 46, the reflected light reflected by the first reflecting zones 102*a* irrespective of the seasons is disregarded. For example, in the illustrations, if the area of the first reflecting zones 102*a* is one half of the area of the base face A and the transmittance of the first reflecting zones 102*a* is negligible, then one half of the quantity of heat of sunlight is decreased irrespective of the seasons. However, if the reflecting zones 102*a* and 102*b* are formed by selective transmitting films intended for decreasing the light of specific wavelengths such as infrared rays, the quantity of heat can be decreased more in summer than in winter.

FIG. 44 shows the winter sunlight pattern small in the quantity of heat. Since the winter sunlight pattern S1 is incident on the base face A of the light transmitting panel 101 at a low incident angle of α, the sunlight pattern S1 is transmitted through the second transmitting zones 103*b* of the light transmitting panel 101 with the reflecting zones 102*a* and 102*b* located as illustrated, to be introduced into the interior as transmitted light x1. Therefore, the sunlight pattern S1 is positively introduced into the interior from the base face A.

FIG. 45 shows the vernal and autumnal sunlight pattern relatively small in the quantity of heat. The vernal and autumnal sunlight pattern S2 with a rather low incident angle of β is incident on the base face A of the light transmitting panel 101. So, in the light transmitting 101 composed as above, the light is partially reflected by the second reflecting zones 102*b* as reflected light y2 toward the exterior, and the light reflected by the second reflecting zones 102*b* and re-reflected by the backs of the first reflecting zones 102*a* and the light transmitted through the second transmitting zones 103*b* are combined, to be introduced into the interior as transmitted light x2. Therefore, the sunlight pattern S2 is partially introduced into the interior from the base face A.

FIG. 46 shows the summer sunlight pattern large in the quantity of heat. The summer sunlight pattern S3 with a high incident angle of y is incident on the base face A of the light transmitting panel 101. So, in the light transmitting panel 101 composed as above, the light is positively reflected by the second reflecting zones 102*b* as reflected light y3, toward the exterior, and on the other hand, the light reflected by the second reflecting zones 102*b* and subsequently reflected by the backs of the first reflecting zones 102*a* and the light transmitted through the second transmitting zones 103*b* are combined to be introduced into the interior as transmitted light x3. Therefore, the sunlight pattern S3 from the base face A is very slightly introduced into the interior.

The present invention effectively uses the light introducing function of transmitting the sunlight patterns S1, S2 and S3 through the first light transmitting zones 103*a* and the second light transmitting zones 103 into the interior, the light introducing function of transmitting the sunlight transmitted through the first transmitting zones 103*a* and reflected by the second reflecting zones 102*b* and subsequently by the first reflecting zones 102*a*, for introducing into the interior through the second transmitting zones 103*b*, and the light intercepting function of transmitting the sunlight patterns S1, S2 and S2 transmitted through the first transmitting zones 103*a* and reflected by the second reflecting zones 102*b*, for returning into the exterior through the first transmitting zones 103*a*.

EFFECTS OF THE INVENTION

The light transmitting panel according to claim 1 of present invention has refractive columns located between two transmitting plates, with holders located at the ends of the plates on both sides. Therefore, incident light can be optically changed by way of refraction, reflection, etc. without impairing the optical function at about the centers of the bodies of the refractive columns. Furthermore, the holders are advantageous for changing the arrangement of the refractive columns, and prevents movement, play, deflection, etc. Furthermore, if clearances are formed between the holders and the sealed edges of the plates, the thermal expansion and contraction of the refractive columns in the axial direction can be accommodated, and the refractive columns can be fastened always in stable state. The light transmitting panel according to claim 2 of the present invention can adopt refractive columns various in sectional form which have not been used hitherto, and so can have refractive columns held and fixed between the plates in contact with them, to be simpler in structure. On the other hand, the light transmitting panel according to claim 5 of the present invention can be formed by using either light transmitting bases or light intercepting bases, and so can be used either as a lighting window or an exterior wall requiring ventilation, etc., being excellent in general applicability.

In general, the present invention can adjust the difference in the quantity of heat in the interior caused by sunlight patterns of respective seasons or respective time zones due to the annual motion or daily motion of the sun, by using the lighting quantity or range adjusting methods of claims 3, 4 and 6 to adjust in reference to the difference in the altitude or azimuth of the sun. Thus, the present invention is epochal and very significant, since the light transmitting panel stationarily installed can be used without any adjustment, to positively intercept the summer sunlight large in the quantity of heat for preventing the temperature rise in the interior for contribution to energy saving in synergism with the heat insulation effect of the multi-layer panel, and to partially or positively introduce the vernal and autumnal or winter sunlight relatively small in the quantity of heat for effectively utilizing the heat.

What is claimed is:

1. A light transmitting panel for a lighting window in an opening of a building, said light transmitting panel for transmitting light from an outside to an inside of said building, said light transmitting panel comprising: two light transmitting plates and a plurality of separate light refractive columns located in parallel to each other between said plates, each of said light refractive columns having a predetermined length and a cross section of a right-triangle shape and wherein the respective light refractive columns are fastened between said two light transmitting plates by holders supporting the respective light refractive columns at least at both end portions of the light refractive columns with a widest portion of said right-triangle shape adjacent one of said two light transmitting plates which is on said outside of said light transmitting panel.

2. A light transmitting panel according to claim 1, wherein said holders are elastic.

3. A light transmitting panel according to claim 2, wherein said holders have a thermal expansion coefficient substantially the same as said light refractive columns.

4. A light transmitting panel according to claim 3, further comprising a frame surrounding said two light transmitting plates.

5. A light transmitting panel according to claim 4, further comprising a gap between at least one end of said light refractive columns and an inside of said frame.

6. A light transmitting panel according to claim 5, further comprising a third holder provided in a center portion of said light refractive columns.

* * * * *